US011463693B2

(12) United States Patent
Reuze et al.

(10) Patent No.: US 11,463,693 B2
(45) Date of Patent: Oct. 4, 2022

(54) GEOMETRIC PARTITION MODE WITH HARMONIZED MOTION FIELD STORAGE AND MOTION COMPENSATION

(71) Applicant: QUALCOMM Incorporated, San Diego, CA (US)

(72) Inventors: Kevin Pascal Andre Reuze, Thorigne-Fouillard (FR); Han Huang, San Diego, CA (US); Chun-Chi Chen, San Diego, CA (US); Vadim Seregin, San Diego, CA (US); Wei-Jung Chien, San Diego, CA (US); Cheng-Teh Hsieh, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 100 days.

(21) Appl. No.: 17/003,733

(22) Filed: Aug. 26, 2020

(65) Prior Publication Data

US 2021/0067776 A1 Mar. 4, 2021

Related U.S. Application Data

(60) Provisional application No. 62/894,575, filed on Aug. 30, 2019.

(51) Int. Cl.
*H04N 19/119* (2014.01)
*H04N 19/577* (2014.01)
(Continued)

(52) U.S. Cl.
CPC ......... *H04N 19/119* (2014.11); *H04N 19/139* (2014.11); *H04N 19/176* (2014.11); *H04N 19/573* (2014.11); *H04N 19/577* (2014.11)

(58) Field of Classification Search
CPC .. H04N 19/119; H04N 19/139; H04N 19/176; H04N 19/573; H04N 19/577
See application file for complete search history.

(56) References Cited

U.S. PATENT DOCUMENTS

| 2011/0200097 | A1* | 8/2011 | Chen | ................... | H04N 19/119 |
| | | | | | 375/E7.243 |
| 2011/0200111 | A1* | 8/2011 | Chen | ................... | H04N 19/537 |
| | | | | | 375/240.16 |

(Continued)

OTHER PUBLICATIONS

Chen J., et al., "Algorithm Description for Versatile Video Coding and Test Model 5 (VTM 5)", 14th JVET Meeting, Mar. 19, 2019-Mar. 27, 2019, Geneva, (The Joint Video Exploration Team of ISO/IEC JTC1/SC29/WG11 and ITU-T SG.16 WP 3), No. JVET-N1002-v1, May 21, 2019, XP030205194, 70 Pages, Retrieved from the Internet: URL:http://phenix.int-evry.fr/jvet/doc_end_user/documents/14_Geneva/wg11/JVET-N1002-v1.zip JVET-N1002-v1.docx.

(Continued)

*Primary Examiner* — Jeremiah C Hallenbeck-Huber
(74) *Attorney, Agent, or Firm* — Shumaker & Sieffert, P.A.

(57) ABSTRACT

Techniques for processing video data are described. The techniques include determining a first partition and a second partition for a current block coded in geometric partition mode, determining a first and second prediction block based on a first and second motion vector, blending the first prediction block and the second prediction block based on weights indicative of an amount to scale samples in the first prediction block and the second prediction block to generate a final prediction block, dividing the current block into a plurality of sub-blocks, determining a set of sub-blocks that each include at least one sample that corresponds to a prediction sample in the final prediction block that was (Continued)

generated based on equal weighting of a sample in the first prediction block and a sample in the second prediction block, and storing respective bi-prediction motion vectors for each sub-block in the determined set of sub-blocks.

27 Claims, 17 Drawing Sheets

(51) Int. Cl.
*H04N 19/573* (2014.01)
*H04N 19/139* (2014.01)
*H04N 19/176* (2014.01)

(56) References Cited

U.S. PATENT DOCUMENTS

| | | | | |
|---|---|---|---|---|
| 2020/0177873 | A1* | 6/2020 | Li | H04N 19/103 |
| 2021/0120242 | A1* | 4/2021 | Nam | H04N 19/51 |
| 2021/0168409 | A1* | 6/2021 | Furht | H04N 19/119 |

OTHER PUBLICATIONS

Gao H., et al., "CE4-Related: Geometric Merge Mode (GEO) Simplifications", JVET-P0107-v1, Joint Video Experts Learn (JVET) of ITU-T SG 16 WP 3 and ISO/IEC JTC 1/SC 29/WG 11, 16th Meeting, Geneva, CH, Oct. 1-11, 2019, pp. 1-8.
Reuze K., et al., "CE4-related: Simplification of GEO Using Angles with Power-of Two Tangents", JVET-P0264-v4, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.
Gao H., et al., "Simplified GEO without multiplication and minimum blending mask storage (harmonization of JVET-P0107, JVET-P0264 and JVET-P0304)", JVET-P0884-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.
Reuze K., et al., "Simplified GEO without Multiplication and Minimum Blending Mask Storage (Harmonization of JVET-P0107, JVET-P0264 and JVET-P0304)", JVET-P0885-v4, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.
Liao R-L., et al., "CE4-related: Simplification of Blending Weights and Motion Field Storage in Geometric Merge Mode", JVET-P0304-V1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.
ITU-T H.264, Series H: Audiovisual and Multimedia Systems, Infrastructure of audiovisual services—Coding of moving Video, Advanced video coding for generic audiovisual services, Mar. 2010, 674 pp.

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.
Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, 12th Meeting Geneva, CH, Jan. 14-23, 2013, JCTVC-L1003-v34, 263 pp.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.
Bross B., et al., "Versatile Video Coding (Draft 10)", JVET-S2001-vE, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 544 Pages.
International Search Report and Written Opinion—PCT/US2020/048207—ISA/EPO—dated Nov. 6, 2020—(17).
Chen J., et al., "Algorithm Description for Versatile Video Coding and Test Model 3 (VTM 3)," 12, JVET Meeting, Oct. 3, 2018-Oct. 12, 2018, Macao, (The Joint Video Exploration Team of ISO/IEC JTC1/SC29/WG11 and ITU-T SG.16), No. JVET-L1002-V1, Dec. 24, 2018 (Dec. 24, 2018), XP030200768, Retrieved from the Internet: URL: http://phenix.int-evry.fr/jvet/doc_end_user/documents/12_Macao/wg11/JVET-L1002-v2.zip JVET-L1002-v2.docx [retrieved on Dec. 24, 2018] (48 pp).
Esenlik (Huawei) S., et al., "Non-CE4: Geometrical Partitioning for Inter blocks", Joint Video Experts Team (JVET) of ITU-TSG.16 WP3 and ISO/IEC JTC 1/SC29/WG11, 15. JVET Meeting, Jul. 3, 2019-Jul. 12, 2019, Gothenburg, (TheJoint Video Exploration Team of ISO/IEC JTC1/SC29/WG11 and ITU-TSG.16), No. JVET-O0489, Jul. 7, 2019 (Jul. 7, 2019), pp. 1-9, XP030219723, Retrieved from the Internet: URL: http://phenix.int-evry.fr/jvet/doc_end_user/documents/15_Gothenburg/wg11/JVET-O0489-v4.zip JVET-O0489_v4.docx [retrieved on Jul. 7, 2019], https://phenix.int-vry.fr/jvet/doc_end_user/documents/15_Gothensburg/wg11/JVET-00489-v4.zip.
Meng (PKU) X.W., et al., "CE4-related: Simplification of Motion Vector Storage Operation for Triangle Merge Mode", JVET-O0418-V3, Joint Video Experts Team (JVET) of ITU-T SG 16 WP 3 and ISO/IEC JTC 1/SC 29/WG 11, 15. JVET Meeting; Jul. 3, 2019-Jul. 12, 2019; Gothenburg; (The Joint Video Exploration Team of ISO/IEC JTC1/SC29/WG11 and ITU-TSG.16), No. JVET-00418, Jul. 4, 2019 (Jul. 4, 2019), pp. 1-5, XP030219520, Retrieved from he Internet: URL: http://phenix.int-evry.fr/jvet/doc_end_user/documents/15_Gothenburg/wg11/JVET-o0418-v4.zip JVET-o0418_43.docx, [retrieved on Jul. 4, 2019].

* cited by examiner

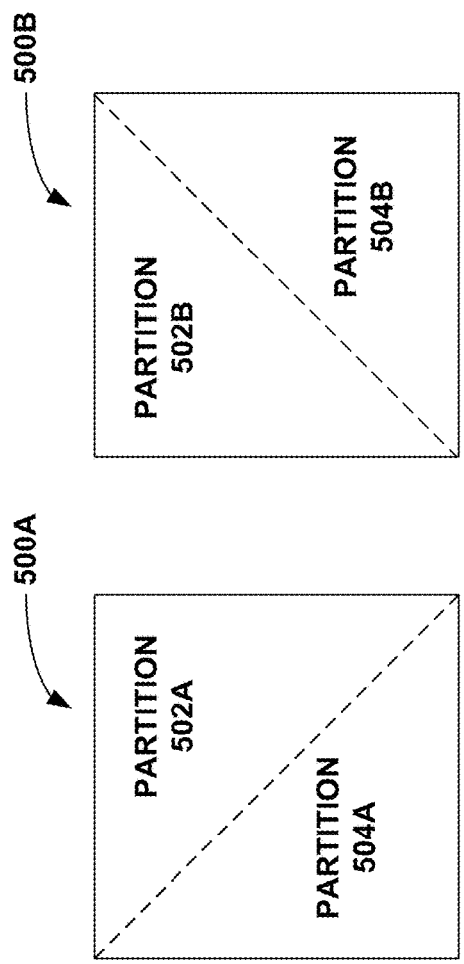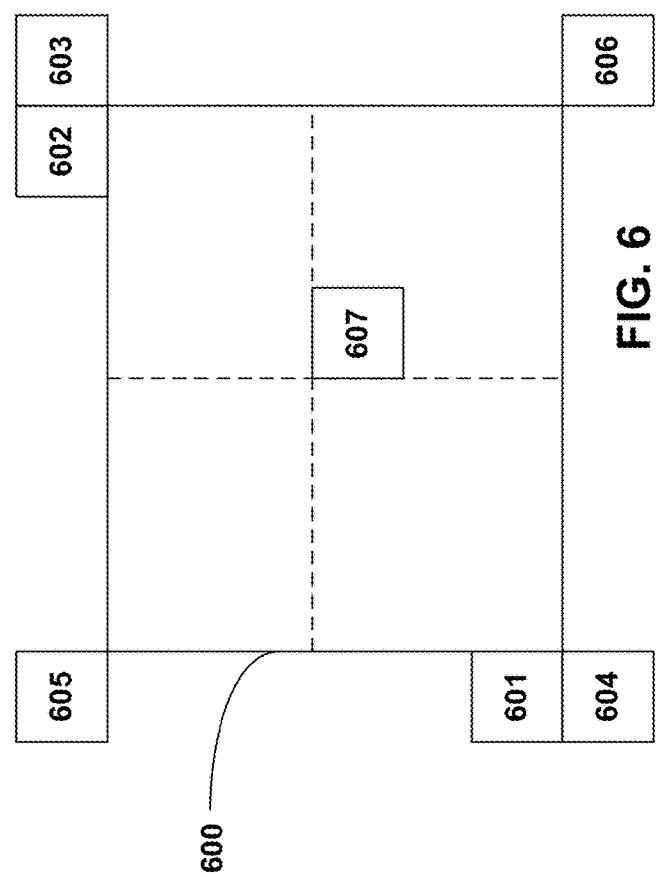

|  | L0 MV | L1 MV |
|---|---|---|
| 0 | X | |
| 1 | | X |
| 2 | X | |
| 3 | | X |
| 4 | X | |

(MERGE INDEX)

FIG. 7

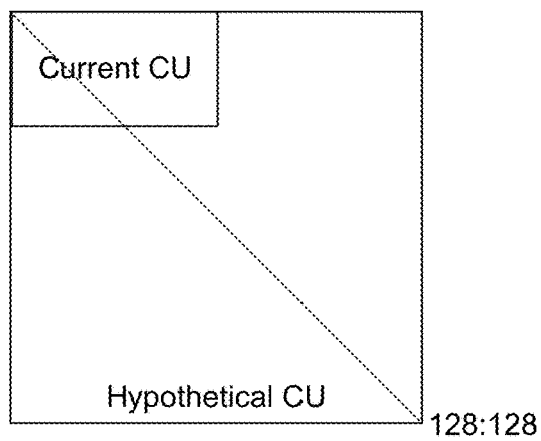 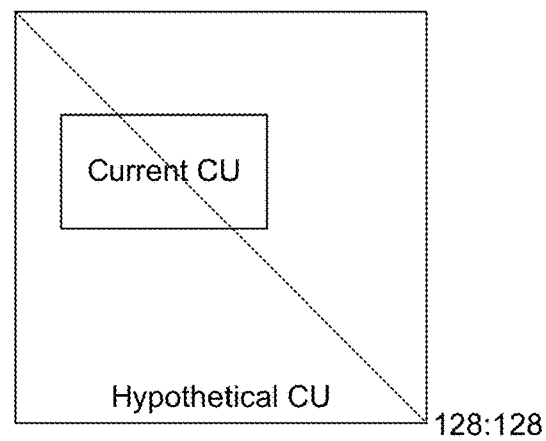
FIG. 17A        FIG. 17B
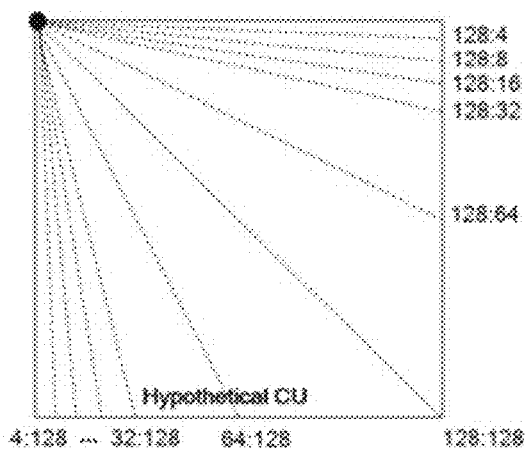 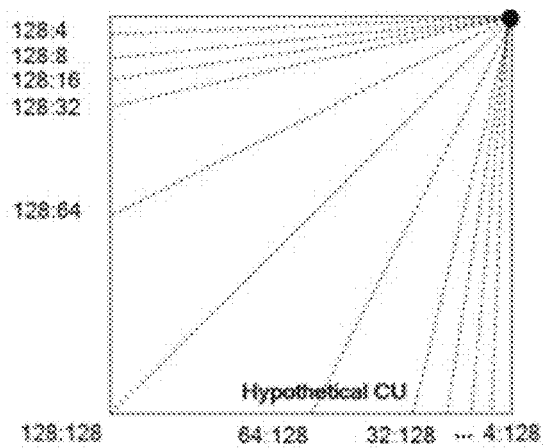
FIG. 18A        FIG. 18B
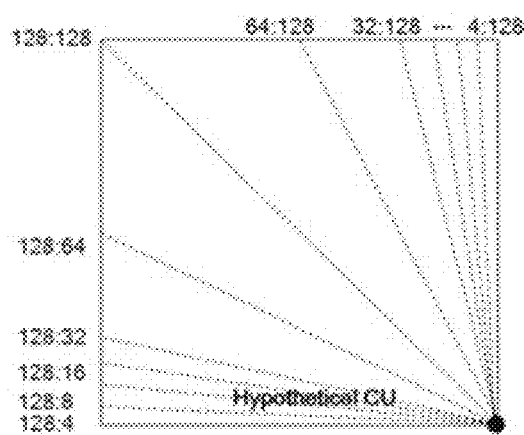 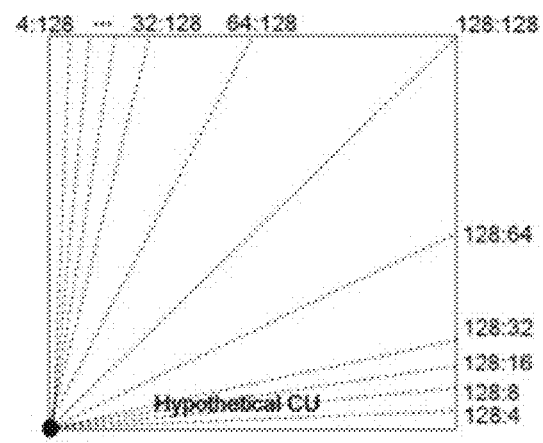
FIG. 18C        FIG. 18D

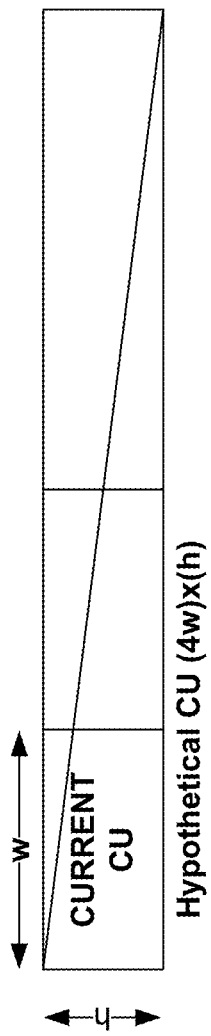
FIG. 19A
FIG. 19B
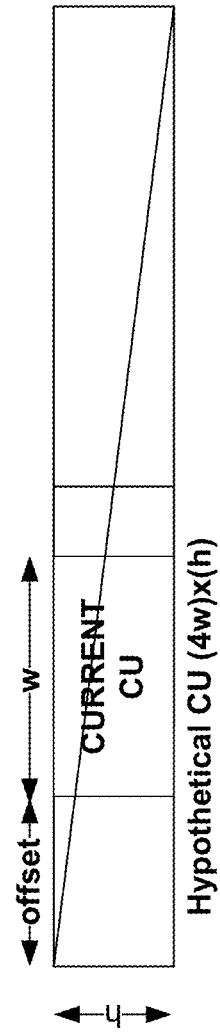
FIG. 20

GEOMETRIC PARTITION MODE WITH HARMONIZED MOTION FIELD STORAGE AND MOTION COMPENSATION

This application claims the benefit of U.S. Provisional Application No. 62/894,575 filed Aug. 30, 2019, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for reducing complexity of inter-prediction such as by simplifying the storage for geometric partition (GEO) mode. The example techniques may provide a technical solution to a technical problem with practical applications to improve the operation of a video coder (e.g., video encoder or video decoder).

For example, in GEO mode, a video coder (e.g., video encoder or video decoder) partitions a current block into a first partition and a second partition. The video coder determines a first motion vector for the first partition and a second motion vector for the second partition, and determines a first prediction block and a second prediction block based on the respective motion vectors. The video coder blends the first and second prediction blocks as part of generating a final prediction block for the current block.

For motion vector storage for the current block (e.g., the motion vector(s) that are stored and utilized later), in GEO, the video coder divides the current block into sub-blocks, and stores a motion vector or motion vectors for each sub-block. This disclosure describes example techniques to determine which motion vector or motion vectors to store for each of the sub-blocks. For instance, the motion vector that is stored for each sub-block may impact deblock filtering of the current block or may impact motion vector candidate list construction for coding a subsequent block. By utilizing the example techniques described in this disclosure, the video coder may store motion vector(s) and provide video coding gains when the stored motion vectors are utilized (e.g., in deblocking or motion vector candidate list construction).

In one example, the disclosure describes a method of processing video data, the method comprising determining a first partition for a current block of the video data coded in geometric partition mode and a second partition for the current block of the video data, determining a first prediction block of the video data based on a first motion vector for the first partition and a second prediction block of the video data based on a second motion vector for the second partition, blending the first prediction block and the second prediction block based on weights indicative of an amount to scale samples in the first prediction block and an amount to scale samples in the second prediction block to generate a final prediction block for the current block, dividing the current block into a plurality of sub-blocks, determining a set of sub-blocks that each include at least one sample that corresponds to a prediction sample in the final prediction block that was generated based on equal weighting of a sample in the first prediction block and a sample in the second prediction block, and storing respective bi-prediction motion vectors for each sub-block in the determined set of sub-blocks.

In one example, the disclosure describes a device for processing video data, the device comprising memory configured to store the video data and processing circuitry coupled to the memory and configured to: determine a first partition for a current block of the video data coded in geometric partition mode and a second partition for the current block of the video data, determine a first prediction block from the stored video data based on a first motion vector for the first partition and a second prediction block from the stored video data based on a second motion vector for the second partition, blend the first prediction block and the second prediction block based on weights indicative of an amount to scale samples in the first prediction block and an amount to scale samples in the second prediction block to generate a final prediction block for the current block, divide the current block into a plurality of sub-blocks, determine a set of sub-blocks that each include at least one sample that corresponds to a prediction sample in the final prediction block that was generated based on equal weighting of a sample in the first prediction block and a sample in the second prediction block, and store respective bi-prediction motion vectors for each sub-block in the determined set of sub-blocks.

In one example, the disclosure describes a computer-readable storage medium storing instructions thereon that when executed cause one or more processors of a device for processing video data to determine a first partition for a current block of the video data coded in geometric partition mode and a second partition for the current block of the video data, determine a first prediction block of the video data based on a first motion vector for the first partition and a second prediction block of the video data based on a second motion vector for the second partition, blend the first prediction block and the second prediction block based on weights indicative of an amount to scale samples in the first prediction block and an amount to scale samples in the second prediction block to generate a final prediction block for the current block, divide the current block into a plurality of sub-blocks, determine a set of sub-blocks that each include at least one sample that corresponds to a prediction sample in the final prediction block that was generated based on equal weighting of a sample in the first prediction block and a sample in the second prediction block, and store respective bi-prediction motion vectors for each sub-block in the determined set of sub-blocks.

In one example, the disclosure describes a device for processing video data, the device comprising means for determining a first partition for a current block of the video data coded in geometric partition mode and a second partition for the current block of the video data, means for determining a first prediction block of the video data based on a first motion vector for the first partition and a second prediction block of the video data based on a second motion vector for the second partition, means for blending the first prediction block and the second prediction block based on weights indicative of an amount to scale samples in the first prediction block and an amount to scale samples in the second prediction block to generate a final prediction block for the current block, means for dividing the current block into a plurality of sub-blocks, means for determining a set of sub-blocks that each include at least one sample that corresponds to a prediction sample in the final prediction block that was generated based on equal weighting of a sample in the first prediction block and a sample in the second prediction block, and means for storing respective bi-prediction motion vectors for each sub-block in the determined set of sub-blocks.

The details of one or more examples are set forth in the accompanying drawings and the description below. Other features, objects, and advantages will be apparent from the description, drawings, and claims.

BRIEF DESCRIPTION OF DRAWINGS

FIGS. 5A and 5B are conceptual diagrams illustrating examples of diagonal split and anti-diagonal split triangle partitions based on inter-prediction, respectively.

FIG. 6 is a conceptual diagram illustrating an example of spatial and temporal neighboring blocks used to construct a candidate list.

FIG. 7 is a table illustrating motion vector prediction selection for triangle partition mode.

FIGS. 17A and 17B are conceptual diagrams illustrating a current coding unit (CU) in a hypothetical CU where the current CU forms its mask by sampling part of the weight values of a mask of the hypothetical CU.

FIGS. 18A-18D are conceptual diagrams illustrating supported angles of a current CU in a hypothetical CU.

FIGS. 19A and 19B are conceptual diagrams illustrating supported angles when a CU is split at starting point from a corner.

FIG. 20 is a conceptual diagram illustrating an example of sampling of weight values in a hypothetical CU with an offset.

DETAILED DESCRIPTION

Figure 1:
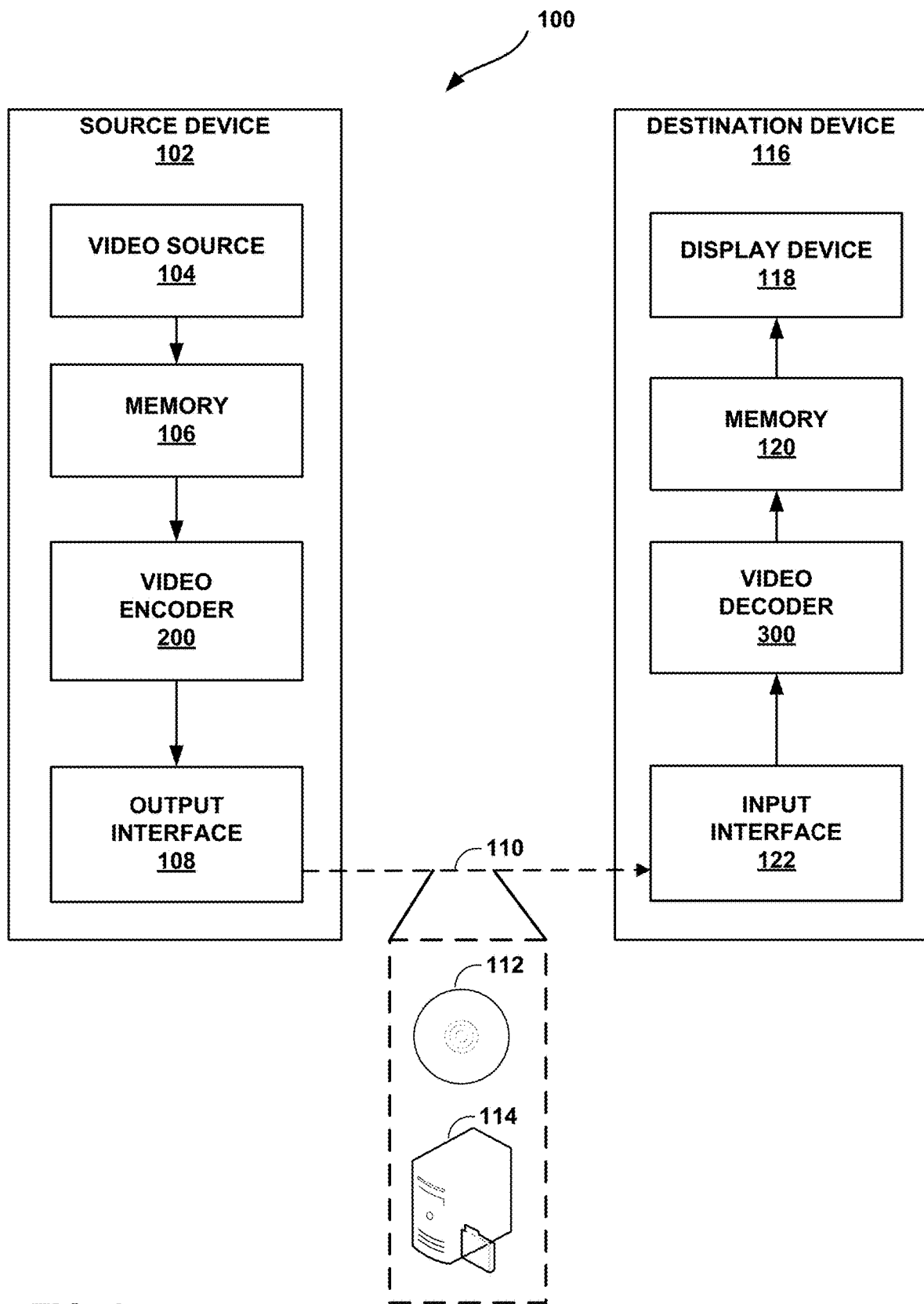
FIG. 1 is a block diagram illustrating an example video encoding and decoding system that may perform the techniques of this disclosure.

In video coding, a video encoder encodes a current block using inter-prediction or intra-prediction. In inter-prediction and intra-prediction, the video encoder generates a prediction block for the current block, determines a difference (e.g., residual block) between the current block and the prediction block, and signals information indicative of the residual block. The video encoder may also signal a prediction mode that indicates a manner in which to generate the prediction block. A video decoder receives the prediction mode information and the residual block information, generates the prediction block based on the signaled prediction mode information, and adds the prediction block to the residual block to reconstruct the current block. In inter-prediction, the prediction block is generated from samples identified by a motion vector, and may be samples in a different picture than the picture that includes the current block. In intra-prediction, the prediction block is generated from samples in the same picture as the current block, such as neighboring samples to the current block.

One example of inter-prediction is geometric partition (GEO) mode. In GEO mode, the video encoder partitions the current block into two partitions. A partition line that partitions the current block into two partitions may be a diagonal line, and although possible, does not need to start or end from a corner of the current block (e.g., although possible, the angle of the partition need not be 45-degrees). The video encoder may determine a first motion vector for the first partition and a second motion vector for the second partition. In some examples, the video encoder may identify a first prediction block based on the first motion vector and a second prediction block based on the second motion vector.

The video encoder may then blend the first prediction block and the second prediction block using weighting to generate a final prediction block. For example, for samples that are proximate to the partition line, the video encoder may scale equally samples from the first and second prediction block and add the resulting values to generate samples in the final prediction block. However, for samples near the boundary of the final prediction block, the video encoder may utilize only samples from the first prediction block or the second prediction block to generate samples in the final prediction block. For samples between the partition line and boundary, the video encoder may weight samples of one of the first or second prediction blocks more than the samples of the other of the first or second prediction blocks for blending.

In GEO mode, the video encoder may determine a residual between the current block and the final prediction block, and signal information indicative of the residual. The video encoder may also signal information indicating that the current block is encoded in GEO mode, information indicative of the partition line, and information to determine the first and second motion vectors and the reference pictures to which the first and second motion vectors point.

The video decoder may partition the current block based on the received information indicative of the partition line, determine the two prediction blocks based on the received information to determine the first and second motion vectors, and generate the final prediction block (e.g. using the weighted blending). The video decoder may then add the final prediction block to the residual to reconstruct the current block.

The video encoder and the video decoder may then store motion vector information for the current block. The stored motion vector information for the current block may be utilized for deblock filtering the current block (e.g., to determine boundary strength values) or to construct a motion vector candidate list for encoding or decoding a subsequent block.

This disclosure describes example techniques to determine the motion vector information for the current block that is to be stored. The stored motion vector information may impact the quality of the deblock filtering or the robustness of the motion vector information in the motion vector candidate list for encoding or decoding a subsequent block. The quality deblock filtering may refer to an amount of reduction in visual artifacts along boundaries of blocks from deblock filtering. Robustness of motion vector information refers to candidate motion vectors that tend to be similar to the motion vector of the subsequent block. By utilizing the example techniques described in this disclosure, the video encoder and the video decoder may store motion vector information for the current block that potentially provides higher quality deblocking filtering and more robust motion vector information in the motion vector candidate list.

In one or more examples, the video encoder and the video decoder may divide the current block into a plurality of sub-blocks (e.g., 4×4 sub-blocks). The video encoder and the video decoder may store motion vector information for each of the sub-blocks. In accordance with one or more examples described in this disclosure, the video encoder and video decoder may determine whether any sample in a sub-block has a corresponding sample in the final prediction block that was generated by equal weighting of a sample in the first prediction block and a sample in the second prediction block.

If the sub-block includes a sample that has a corresponding sample in the final prediction block that was generated by equal weighting of a sample in the first prediction block and a sample in the second prediction block, then the video encoder and the video decoder may determine a bi-prediction motion vector. It should be understood that, although possible, "bi-prediction motion vector" does not necessarily mean that there are two motion vectors. Rather, there may be example operations that the video encoder and the video decoder perform to determine the bi-prediction motion vector. For example, if the first motion vector or the second motion vector used to identify the first and second prediction blocks refer to reference pictures in different reference picture lists, then the video encoder and the video decoder may store both the first motion vector and the second motion vector for the sub-block as the bi-prediction motion vector for the sub-block. If the first motion vector and the second motion vector refer to reference pictures in the same reference picture, then the video encoder and the video decoder may select one of the first motion vector or the second motion vector as the bi-prediction motion vector.

If the sub-block does not include a sample that has a corresponding sample in the final prediction block that was generated by equal weighting of a sample in the first prediction block and a sample in the second prediction block, then the video encoder or the video decoder may store either the first motion vector or the second motion vector as the motion vector for the sub-block. Whether the video encoder and the video decoder store the first motion vector or the second motion vector may be based on locations of the sub-blocks in current block. For instance, if a majority of the sub-block resides in the first partition, then the video encoder and video decoder may store the first motion vector for the sub-block. If a majority of the sub-block resides in the second partition, then the video encoder and video decoder may store the second motion vector for the sub-block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for unifying motion field storage and motion weight derivation of triangle prediction mode (TPM) and geometric partition mode (GEO). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for unifying motion field storage and motion weight derivation of triangle prediction mode (TPM) and geometric partition mode (GEO). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). A more recent of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-S2001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

VVC may also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. VVC may provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a video coder (e.g., video encoder 200 or video decoder 300) may be configured to perform the example techniques. For example, video encoder 200 and video decoder 300 may be configured to inter-predict a current block in GEO mode, also called geometric partition mode (GPM). In GEO mode, video encoder 200 and video decoder 300 may partition the current block into a first partition and a second partition (e.g., based on a partition line that splits the current block into the first and second partitions). For each partition, video encoder 200 and video decoder 300 may determine a motion vector (i.e., first motion vector for first partition and second motion vector for second partition). Video encoder 200 and video decoder 300 may identify a first prediction block based on the first motion vector and a second prediction block based on the second motion vector.

Video encoder 200 and video decoder 300 may blend the first prediction block and the second prediction block to generate a final prediction block. As one example way to blend, video encoder 200 and video decoder 300 may scale a sample in the first prediction block by a first weight and scale a co-located sample in the second prediction block by a second weight, and add the resulting values together. A sample in the first prediction block and a sample in the second prediction may be co-located with the two samples in the same position in respective first and second prediction blocks.

The weights applied for blending may be indicative of the amount that a sample from the first or second partition contributes to the final prediction block. For example, as described in more detail below, the weight for one sample in the first prediction block may be 1/8 and the weight for a co-located sample in the second prediction block may be 7/8. In this example, the sample in the second prediction block is a larger contributor to the sample value in the final prediction block as compared to the sample in the first prediction block. As another example, the weight for one sample in the first prediction block and a weight for a co-located sample in the second prediction block may be 4/8. In this example, the sample in both the first prediction block and the co-located sample in the second prediction block contribute the same to the sample value in the final prediction block.

With such blending, video encoder 200 and video decoder 300 may generate a final prediction block. There may be one-to-one correspondence in samples in the final prediction block and the current block. For example, if the current block is 8×8, then the prediction block may also be 8×8. Video encoder 200 and video decoder 300 may encode or decode the current block using inter-prediction based on the prediction block. For example, video encoder 200 may determine a residual between the current block and the prediction block, and signal the residual. Video decoder 300 may receive the residual and add the residual to the prediction block to reconstruct the current block.

In accordance with one or more examples described in this disclosure, video encoder 200 and video decoder 300 may be configured to store motion vector information for the current block. To store the motion vector information, video encoder 200 and video decoder 300 may divide the current block into sub-blocks (e.g., 4×4 sub-blocks).

Each sample in each of the sub-blocks may correspond with a sample in the prediction block. A sample in a sub-block of the current block may correspond with a sample in the prediction block if the two samples are co-located, as one example. Video encoder 200 and video decoder 300 may determine whether a sample in a sub-block corresponds with a prediction sample in the final prediction block that was generated based on equal weighting of a sample in the first prediction block and a sample in the second prediction block. For example, if the prediction sample in the final prediction block was generated by scaling a sample in the first prediction block by 4/8 and scaling a sample in the second prediction block by 4/8, then the prediction sample in the final prediction block may be considered as being generated based on equal weighting of a sample in the first prediction block and a sample in the second prediction block.

If a sub-block includes at least one sample that corresponds to a prediction sample in the final prediction block that was generated based on equal weighting of a sample in the first prediction block and a sample in the second prediction block, then video encoder 200 and video decoder 300 may store a bi-prediction motion vector for the sub-block. If a sub-block does not include any samples that correspond to prediction samples in the final prediction block that were generated based on equal weighting of samples in the first prediction block and samples in the second prediction block, then video encoder 200 and video decoder 300 may store a uni-prediction motion vector.

The term "bi-prediction motion vector" should not be considered limited to requiring that there be two motion vectors. Rather, video encoder 200 and video decoder 300 may perform one or more operations to determine the bi-prediction motion vector. For example, the first prediction block may be in a first reference picture, and the second prediction block may be in a second reference picture. The first reference picture and the second reference picture may be in different reference picture lists or in the same reference picture lists. If the first prediction block and the second prediction block are in different reference picture lists (i.e., the first motion vector and the second motion vector are from different reference picture lists), then the bi-prediction motion vector is the first motion vector and the second motion vector. If the first prediction block and the second prediction block are in the same reference picture list (i.e., the first motion vector and the second motion vector are from same reference picture list), then the bi-prediction motion vector is one of the first motion vector or the second motion vector.

The term "uni-motion vector" refers to there being only one motion vector, and may be based on the location of the sub-block in the current block. For example, if video encoder 200 and video decoder 300 are to store a uni-motion vector for a sub-block, video encoder 200 and video decoder 300 may store the first motion vector if a majority of the samples of the sub-block are in the first partition and store the second motion vector if a majority of the samples of the sub-block are in the second partition. If a sub-block has equal samples in the first and second partitions, then that sub-block would include at least one sample that corresponds to a prediction sample in the final prediction block that was generated based on equal weighting of samples in the first prediction block and samples in the second prediction block, and therefore, video encoder 200 and video decoder 300 would store a bi-prediction motion vector.

For example, a video coder may be configured to determine one or more angles, from a set of angles, to be used for partitioning a current block using geometric partition mode (GEO), wherein the set of angles from which the one or more angles are determined are the same as a set of angles available for triangle partition mode (TPM); partition the current block based on the determined one or more angles; and code the current block based on the partitioning of the current block. As another example, the video coder may be configured to determine one or more weights, from a set of weights, to be used for blending a current block using GEO, wherein the set of weights from which the one or more weights are determined are the same as a set of weights available for TPM; blend the current block based on the determined one or more weights; and code the current block based on the blending of the current block. As another example, the video coder may be configured to determine a motion field storage for using GEO, wherein the motion field storage is the same as a motion field storage available for TPM; and code the current block based on the determined motion field storage.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
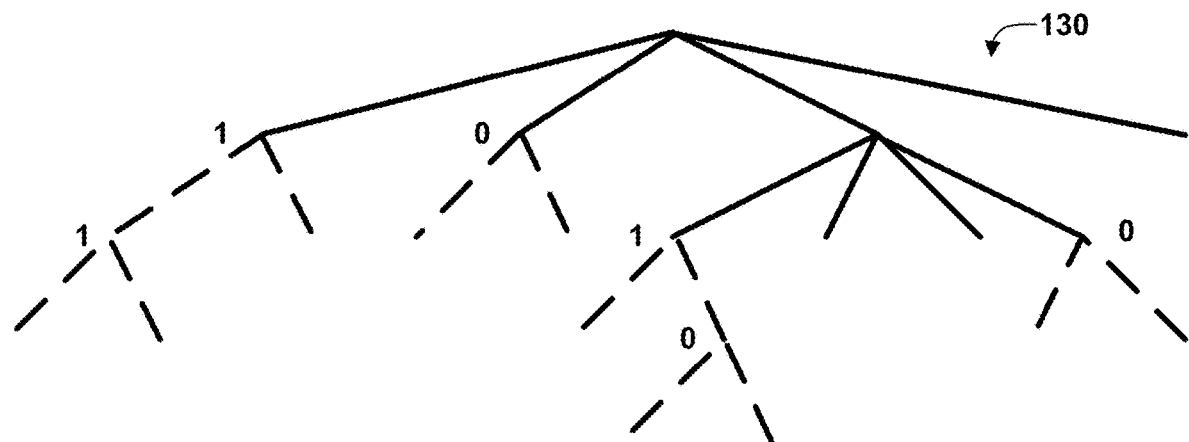
FIGS. 2A and 2B are conceptual diagrams illustrating an example quadtree binary tree (QTBT) structure, and a corresponding coding tree unit (CTU).
Figure 2B:
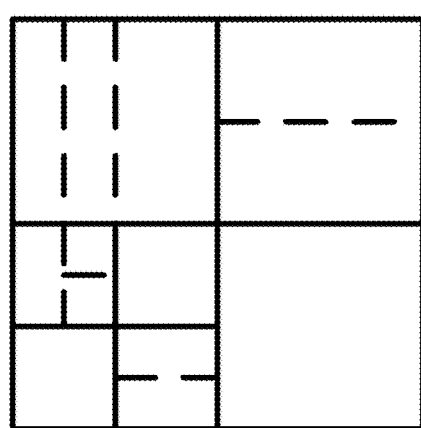

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
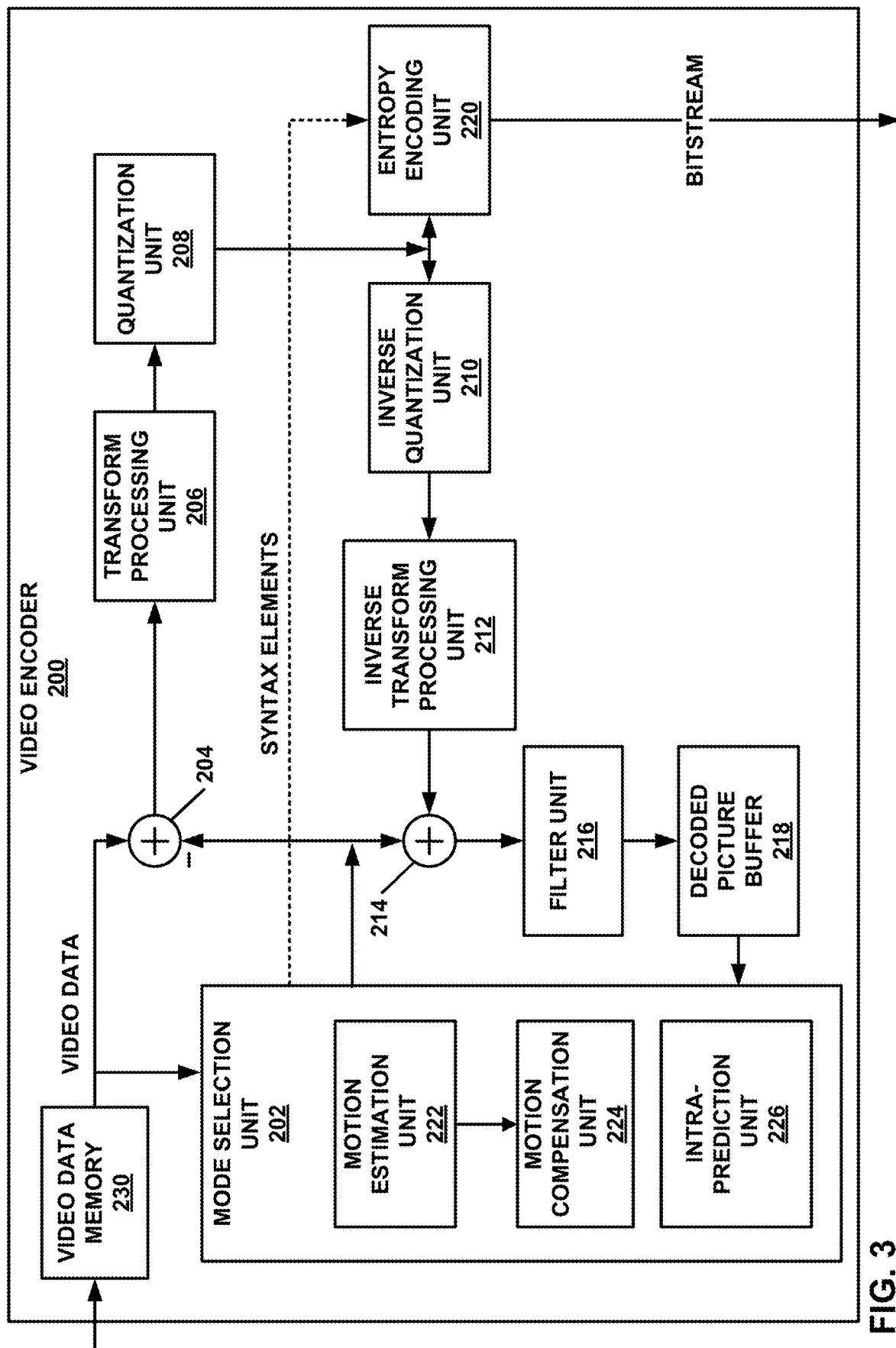
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the ITU-T H.265 (HEVC) video coding standard and the ITU-T H.266 (VVC) video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, mode selection unit 202 may configure motion estimation unit 222 and motion compensation unit 224 to perform techniques related to GEO mode. For example, motion estimation unit 222 may divide a current block into two partitions (e.g., split the current block into two partitions along a partition line). Motion estimation unit 222 may determine a first motion vector for the first partition and a second motion vector for the second partition. Motion compensation unit 224 may determine a first prediction block based on the first motion vector and a second prediction block based on the second motion vector.

Motion compensation unit 224 may blend the first prediction block and the second prediction block based on weights indicative of an amount to scale samples in the first prediction block and an amount to scale samples in the second prediction block to generate a final prediction block for the current block. For example, motion compensation unit 224 may determine a first scaling factor (e.g., 0, 1/8, 2/8, 3/8, 4/8, 5/8, 6/8, 7/8, or 8/8) for a sample in the first prediction block and a second scaling factor for a co-located sample in the second prediction block. In some examples, the first scaling factor and the second scaling factor add to one.

The scaling factors may be weights indicative of an amount to scale a sample in the first prediction block and an amount to scale a sample in the second prediction block to generate, by summing the scaled samples of the first and second prediction blocks, a final prediction block for the current block. The scaled samples may be luminance values for luma blocks and chrominance values for chroma blocks. For example, to generate a prediction sample in the final prediction block, motion compensation unit 224 may multiply the sample value of a sample in the first prediction block by 3/8 and multiply the sample value of a co-located sample in the second prediction block by 5/8 to generate a prediction sample value for a co-located sample in the final prediction block. In this example, 3/8 and 5/8 are examples of the amount to scale a sample in the first prediction block and the amount to scale a sample in the second prediction block, respectively. The result of the scaling is then added together to generate the prediction sample in the final prediction block.

In one or more examples, motion estimation unit 222 may be configured to store motion vector information for the current block (e.g., store the motion vector information in decoded picture buffer 218, video data memory 230, or memory 106, as a few examples). To determine the motion vector information the current block, motion estimation unit 222 may divide the current block into a plurality of sub-blocks (e.g., each sub-block is of size 4×4). Motion estimation unit 222 may determine a set of sub-blocks that each include at least one sample that corresponds to a prediction sample in the final prediction block that was generated based on equal weighting of a sample in the first prediction block and a sample in the second prediction block. For example, motion estimation unit 222 may determine which sub-blocks include at least one sample that corresponds to a prediction sample in the final prediction block that was generated by scaling a sample in the first prediction block by 4/8 and scaling a sample in the second prediction block 4/8, and summing the scaled samples. In this example, because the scaling by 4/8 is the same for both the samples in the first and second prediction blocks, there is equal weighting of the sample in the first prediction block and the sample in the second prediction block.

Motion estimation unit 222 may store respective bi-prediction motion vectors for each sub-block in the determined set of sub-blocks. For example, motion estimation unit 222 may determine whether the first motion vector and the second motion vector are from different reference picture lists (e.g., refer to reference pictures in different reference picture lists). Motion estimation unit 222 may be configured to one of: (1) store both the first motion vector and the second motion vector for each sub-block of the set of sub-blocks based on the first motion vector and the second motion vector being from different reference picture lists, or (2) select one of the first motion vector or the second motion vector based on the first motion vector and the second motion vector being from the same reference picture list, and store the selected one of the first motion vector or the second motion vector for each sub-block of the set of sub-blocks.

The set of sub-blocks may be considered as a first set of sub-blocks of the current block. Motion estimation unit 222 may be configured to determine a second set of sub-blocks that do not include any samples that correspond to prediction samples in the final prediction block that were generated based on equal weighting of samples in the first prediction block and samples in the second prediction block. Motion estimation unit 222 may determine, for each sub-block in the second set of sub-blocks, whether a majority of the sub-block is within the first partition or the second partition, and store, for each sub-block in the second set of sub-blocks, the first motion vector based on the majority of the sub-block being within the first partition or the second motion vector based on the majority of the sub-block being within the second partition.

As one example, filter unit 216 may utilize the stored motion vectors for the sub-blocks for deblock filtering. As another example, motion estimation unit 222 and motion compensation unit 224 may utilize the stored motion vectors to construct candidate lists for merge mode or AMVP mode when coding a subsequent block.

For intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In one or more examples, for GEO mode, mode selection unit 202 may cause entropy encoding unit 220 to signal information that video decoder 300 is to utilize to reconstruct the current block For example, mode selection unit 202 may signal information indicating that the current block is coded in the GEO mode and may signal information indicative of the manner in which to partition the current block (e.g., based on angle of the partition line). Mode selection unit 202 may also signal information used to determine the first motion vector for the first partition and the second motion vector for the second partition.

Video encoder 200 represents an example of a device configured to encode video data including a memory configured to store video data, and one or more processing units implemented in circuitry and configured to determine one or more angles, from a set of angles, to be used for partitioning a current block using geometric partition mode (GEO), wherein the set of angles from which the one or more angles are determined are the same as a set of angles available for triangle partition mode (TPM); partition the current block based on the determined one or more angles; and encode the current block based on the partitioning of the current block. As another example, video encoder 200 may be configured to determine one or more weights, from a set of weights, to be used for blending a current block using GEO, wherein the set of weights from which the one or more weights are determined are the same as a set of weights available for triangle partition mode (TPM); blend the current block based on the determined one or more weights; and encode the current block based on the blending of the current block. As another example, video encoder 200 may be configured to determine a motion field storage for using GEO, wherein the motion field storage is the same as a motion field storage available for TPM; and encode the current block based on the determined motion field storage.

Figure 4:
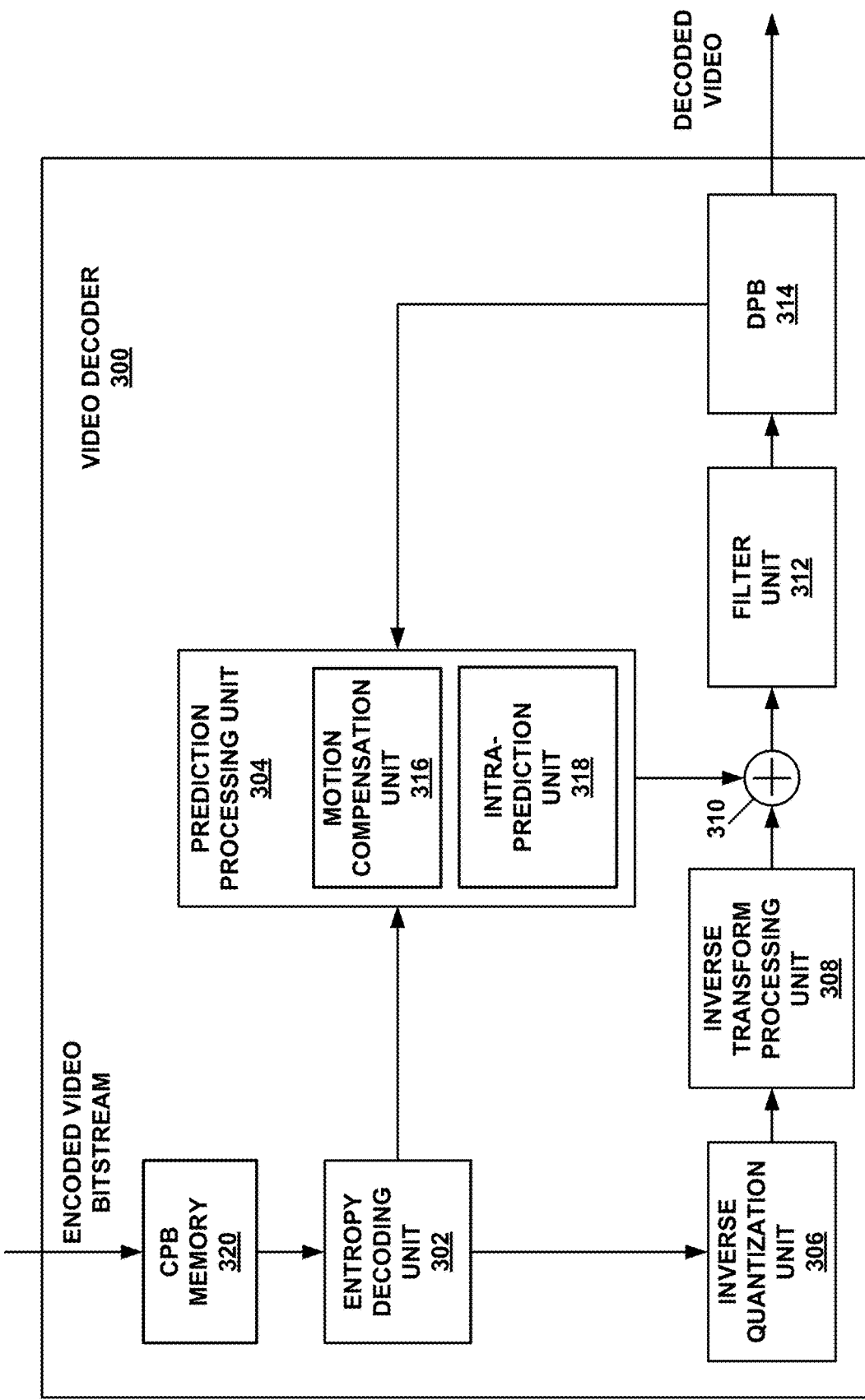
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

For example, prediction processing unit 304 may determine that a current block is coded in GEO mode. Prediction processing unit 304 may receive information indicative of the manner in which to partition the current block (e.g., based on angle of the partition line) and partition the current block into a first partition and a second partition. Prediction processing unit 304 may also determine the first motion vector for the first partition and the second motion vector for the second partition based on information signaled by video encoder 200.

Motion compensation unit 316 may determine a first prediction block based on the first motion vector and a second prediction block based on the second motion vector. Motion compensation unit 316 may blend the first prediction block and the second prediction block based on weights indicative of an amount to scale samples in the first prediction block and an amount to scale samples in the second prediction block to generate a final prediction block for the current block. For example, motion compensation unit 316 may determine a first scaling factor (e.g., 0, 1/8, 2/8, 3/8, 4/8, 5/8, 6/8, 7/8, or 8/8) for a sample in the first prediction block and a second scaling factor for a co-located sample in the second prediction block. In some examples, the first scaling factor and the second scaling factor add to one.

As described above, the scaling factors may be weights indicative of an amount to scale a sample in the first prediction block and an amount to scale a sample in the second prediction block to generate a final prediction block for the current block. For example, to generate a prediction sample in the final prediction block, motion compensation unit 316 may multiply the sample value of a sample in the first prediction block by 3/8 and multiply the sample value of a co-located sample in the second prediction block by 5/8 to generate a prediction sample value for a co-located sample in the final prediction block. In this example, 3/8 and 5/8 are examples of the amount to scale a sample in the first prediction block and the amount to scale a sample in the second prediction block, respectively.

In one or more examples, motion compensation unit 316 may be configured to store motion vector information for the current block (e.g., store the motion vector information in decoded picture buffer 314, CPB memory 320, or memory 120, as a few examples). To determine the motion vector information the current block, motion compensation unit 316 may divide the current block into a plurality of sub-blocks (e.g., each sub-block is of size 4×4). Motion compensation unit 316 may determine a set of sub-blocks that each include at least one sample that corresponds to a prediction sample in the final prediction block that was generated based on equal weighting of a sample in the first prediction block and a sample in the second prediction block. For example, motion compensation unit 316 may determine which sub-blocks include at least one sample that corresponds to a prediction sample in the final prediction block that was generated by scaling a sample in the first prediction block by 4/8 and scaling a sample in the second prediction block 4/8. In this example, because the scaling by 4/8 is the same for both the samples in the first and second prediction blocks, there is equal weighting of the sample in the first prediction block and the sample in the second prediction block.

Motion compensation unit 316 may store respective bi-prediction motion vectors for each sub-block in the determined set of sub-blocks. For example, motion compensation unit 316 may determine whether the first motion vector and the second motion vector are from different reference picture lists (e.g., refer to reference pictures in different reference picture lists). Motion compensation unit 316 may be configured to one of: (1) store both the first motion vector and the second motion vector for each sub-block of the set of sub-blocks based on the first motion vector and the second motion vector being from different reference picture lists, or (2) select one of the first motion vector or the second motion vector based on the first motion vector and the second motion vector being from the same reference picture list, and store the selected one of the first motion vector or the second motion vector for each sub-block of the set of sub-blocks.

The set of sub-blocks may be considered as a first set of sub-blocks of the current block. Motion compensation unit 316 may be configured to determine a second set of sub-blocks that do not include any samples that correspond to prediction samples in the final prediction block that were generated based on equal weighting of samples in the first prediction block and samples in the second prediction block. Motion compensation unit 316 may determine, for each sub-block in the second set of sub-blocks, whether a majority of the sub-block (e.g., majority of the samples of the sub-block) is within the first partition or the second partition, and store, for each sub-block in the second set of sub-blocks, the first motion vector based on the majority of the sub-block being within the first partition or the second motion vector based on the majority of the sub-block being within the second partition.

As one example, filter unit 312 may utilize the stored motion vectors for the sub-blocks for deblock filtering. As another example, motion compensation unit 316 may utilize the stored motion vectors to construct candidate lists for merge mode or AMVP mode when coding a subsequent block.

If the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to form the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine one or more angles, from a set of angles, to be used for partitioning a current block using geometric partition mode (GEO), wherein the set of angles from which the one or more angles are determined are the same as a set of angles available for triangle partition mode (TPM); partition the current block based on the determined one or more angles; and decode the current block based on the partitioning of the current block. As another example, video decoder 300 may be configured to determine one or more weights, from a set of weights, to be used for blending a current block using GEO, wherein the set of weights from which the one or more weights are determined are the same as a set of weights available for TPM; blend the current block based on the determined one or more weights; and decode the current block based on the blending of the current block. As another example, video decoder 300 may be configured to determine a motion field storage for using GEO, wherein the motion field storage is the same as a motion field storage available for TPM; and decode the current block based on the determined motion field storage.

The following describes some video coding standards, including geometric partition mode (GEO) storage related techniques of video coding standards. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is the High Efficiency Video Coding (HEVC) standard, developed by the Joint Collaboration Team on Video Coding (JCT-VC) of ITU-T Video Coding Experts Group (VCEG) and ISO/IEC Motion Picture Experts Group (MPEG). As noted above, the specification text of Versatile Video Coding and Test Model 6 (VTM 6) could be referred to as VVC Draft 6.

As introduced in JVET-N1002 (Sullivan, et al. "Algorithm description for Versatile Video Coding and Test Model 5," Joint Video Experts Team (WET) of ITU-T SG 16 WP 3 and ISO/IEC JTC 1/SC 29/WG 11, 14$^{th}$ Meeting: Geneva, CH, 19-27 Mar. 2019), the triangle partition mode (TPM) is applied only to CUs coded in skip or merge mode, but not in MMVD (merge with motion vector difference) or CIIP (combined inter and intra prediction) mode. For a CU satisfying those conditions, a flag is signalled to indicate whether the triangle partition mode is applied or not.

When triangle partition mode is used, the CU is split evenly into two triangle shaped partitions, using either the diagonal split or the anti-diagonal split, as illustrated in FIGS. 5A and 5B. For example, FIGS. 5A and 5B illustrate blocks 500A and 500B, respectively. Block 500A is partitioned into first partition 502A and second partition 504A, and block 500B is partitioned into first partition 502B and second partition 504B.

Each triangle partition in the CU is inter-predicted using its own motion. Only uni-prediction may be allowed for each partition. That is, each partition (e.g., partition 502A, 504A, 502B, or 504B) has one motion vector and one reference index into a reference picture list. The uni-prediction motion constraint is applied to ensure that, same as the conventional bi-prediction, only two motion compensated prediction are needed for each CU. For example, partition 502A and partition 504A may each have only one motion vector, meaning that block 500A is limited to only two motion vectors.

The uni-prediction motion for each partition (e.g., first motion vector for first partition 502A and second motion vector for second partition 504A, and similar to partitions 502B and 504B) is derived from a uni-prediction candidate list constructed using the process described with respect to uni-prediction candidate list construction. If the CU-level flag indicates that the current CU is coded using the triangle partition mode and if triangle partition mode is used, then a flag indicating the direction of the triangle partition (diagonal or anti-diagonal), and two merge indices (one for each partition), are further signalled. FIGS. 5A and 5B illustrate the example of diagonal and anti-diagonal partitioning with respective dashed partition lines.

After predicting each of the triangle partitions (e.g., determining a first prediction block for first partition 502A or 502B and a second prediction block for second partition 504A or 504B based on respective motion vectors), the sample values along the diagonal or anti-diagonal edge (e.g., partition line) are adjusted using a blending processing with adaptive weights. For example, video encoder 200 and video decoder 300 may generate a final prediction block by blending with adaptive weights the first partition block and the second partition block. This is the prediction signal (e.g., final prediction block) for the whole CU and transform and quantization processes may be applied to the whole CU as in other prediction modes. The motion field of a CU predicted using the triangle partition mode is stored in 4×4 units as described with respect to blending along the triangle partition edge.

The following describes uni-prediction candidate list construction. The uni-prediction candidate list includes five uni-prediction motion vector candidates. The motion vector candidates are derived from seven neighboring blocks including five spatial neighboring blocks (labelled 601-605 of block 600 in FIG. 6) and two temporal co-located blocks (labelled 606 and 607 in FIG. 6). The motion vectors of the seven neighboring blocks are collected and put into the uni-prediction candidate list according to the following order: first, the motion vectors of the uni-predicted neighboring blocks; then, for the bi-predicted neighboring blocks, the L0 (list 0) motion vectors (that is, the L0 motion vector part of the bi-prediction MV), the L1 (list 1) motion vectors (that is, the L1 motion vector part of the bi-prediction MV), and averaged motion vectors of the L0 and L1 motion vectors of the bi-prediction MVs. If the number of candidates is less than five, zero motion vector is added to the end of the list.

L0 or list 0 and L1 or list 1 refer to reference picture lists. For instance, for inter-prediction, video encoder 200 and video decoder 300 each construct one or two reference picture lists (e.g., list 0 and/or list 1). The reference picture list(s) include a plurality of reference pictures, and an index into the reference picture list or lists is used to identify the reference picture or pictures used for inter-prediction. List 0 motion vectors or list 1 motion vectors refer to motion vectors that point to a reference picture identified in list 0 or list 1, respectively. For example, video encoder 200 or video decoder 300 may determine whether a motion vector is from a reference picture list, which may mean that video encoder 200 and video decoder 300 determine whether a motion vector points to a reference picture stored in the first reference picture list (e.g., list 0) or in the second reference picture list (e.g., list 1).

Figure 7:
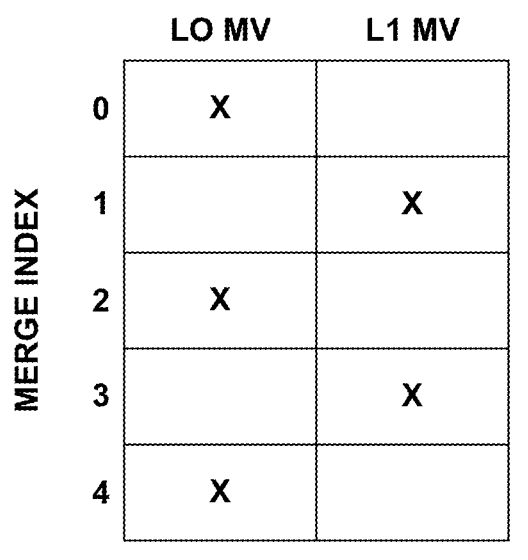

The following describes triangular prediction mode (TPM) motion inference from merge list. The following introduces TPM candidate list construction. Given a merge candidate index, the uni-prediction motion vector is derived from the merge candidate list. For a candidate in the merge list, the LX MV (with X equal to the parity of the merge candidate index value) for the candidate is used as the uni-prediction motion vector for triangle partition mode. These motion vectors are marked with "x" in FIG. 7. In case a corresponding LX motion vector does not exist, the L(1−X) motion vector of the same candidate in the extended merge prediction candidate list is used as the uni-prediction motion vector for triangle partition mode. For example, supposing the merge list is composed of 5 sets of bi-prediction motions, the TPM candidate list is composed of, from the first to the last, L0/L1/L0/L1/L0 MV of $0^{th}/1^{st}/2^{nd}/3^{rd}/4^{th}$ merge candidate. Then, the TPM mode includes signaling two different merge indices, one for each triangle partition, to indicate the use of candidates in the TPM candidate list.

The following describes blending along the triangle partition edge. After predicting each triangle partition using the triangle partition's own motion, blending is applied to the two prediction signals to derive samples around the diagonal or anti-diagonal edge. The following weights are used in the blending process: {7/8, 6/8, 5/8, 4/8, 3/8, 2/8, 1/8} for luma, as shown in FIG. 8A, and {6/8, 4/8, 2/8} for chroma, as shown in FIG. 8B.

Figures 8A, 8B:
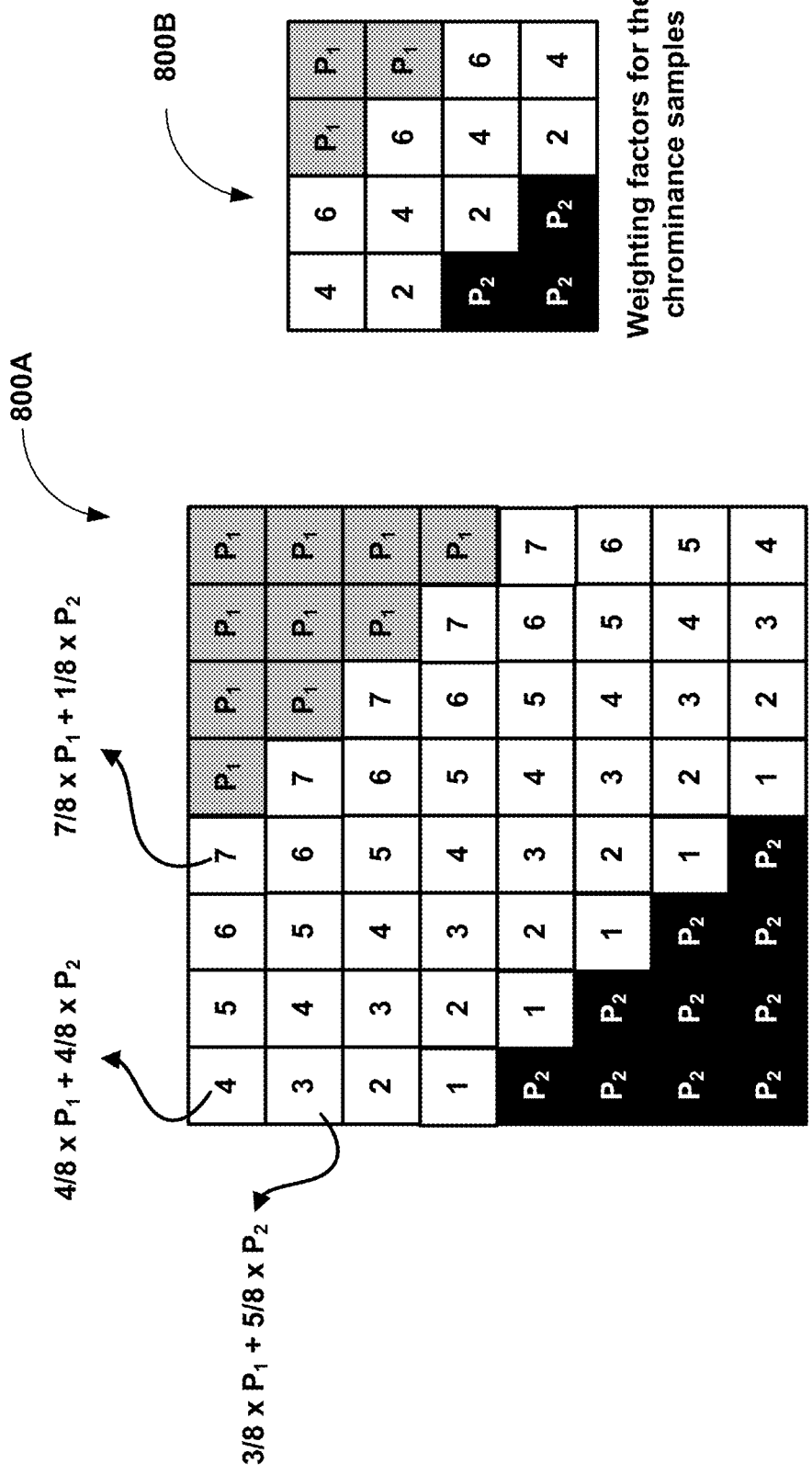
FIGS. 8A and 8B are conceptual diagrams illustrating weights used for a blending process for a luma component and a chroma component, respectively.

Stated another way, FIGS. 8A and 8B illustrate final prediction blocks for luma and chroma respectively that are generated for a current block that is partitioned with a diagonal line from the top-left corner to the bottom-right corner forming a first partition and a second partition. Video encoder 200 and video decoder 300 may determine a first prediction block based on the first motion vector and a second prediction block based on the second motion vector. Video encoder 200 and video decoder 300 may blend the first and second prediction blocks based on the weighting as illustrated in FIGS. 8A and 8B.

For example, to generate the top-left prediction sample in the final prediction block, video encoder 200 and video decoder 300 may scale the top-left prediction sample in the first prediction block by 4/8 and scale the top-left prediction sample in the second prediction block and add the result together (e.g., 4/8*P1+4/8*P2). To generate the prediction sample to the right of top-left prediction sample in the final prediction block, video encoder 200 and video decoder 300 may scale the prediction sample to the right of the top-left prediction sample in the first prediction block by 5/8 and scale the prediction sample to the right of the top-left prediction sample in the second prediction block by 3/8 and add the result together (e.g., 5/8*P1+3/8*P2). Video encoder 200 and video decoder 300 may repeat such operations to generate the final prediction block.

Some of the samples in the final prediction block may be equal to co-located samples in the first or second prediction block. For example, the top-right sample in final prediction block 800A is equal to the top-right sample in the first prediction block, which is why the top-right sample in final prediction block 800A is shown as P1. The bottom-right sample in the final prediction block 800A is equal to the bottom-right sample in the second prediction block, which is why the bottom-right sample in final prediction block 800A is shown as P2.

Accordingly, FIGS. 8A and 8B may be considered as illustrating weights indicative of an amount to scale samples in the first prediction block and an amount to scale samples in the second prediction block to generate a final prediction block for the current block. For example, a weight of 4 means that a sample in the first prediction block is scaled by 4/8 and a sample in the second prediction block is scaled by 4/8. A weight of 2 means that a sample in the first prediction block is scaled by 2/8 and a sample in the second prediction block is scaled by 6/8.

The weights illustrated in FIGS. 8A and 8B are one example. For example, for different sized blocks the weights may be different. Also, the partition line may be not be from one corner of the block to another corner of the block. For example, in GEO mode, the partition line may be at different angles. That is, the TPM mode may be considered as an example of GEO mode, where the partition line is the diagonal or the anti-diagonal of a block. However, in GEO mode, there may be other angles for the partition line, as illustrated and described in more detail below. In one or more examples, for the different angles of partition, there may be different weights. Video encoder 200 and video decoder 300 may store the weights for the different angles of partitions, and utilize the stored weights to determine an amount by which to scale samples in the first and second prediction blocks.

The following describes motion field storage. The motion vectors of a CU coded in triangle partition mode (TPM) or GEO more are stored in 4×4 units. That is, video encoder 200 and video decoder 300 may divide the current block into sub-blocks (e.g., of size 4×4) and store motion vector information for each of the sub-blocks. Depending on the position of each 4×4 sub-block, in some techniques, video encoder 200 and video decoder 300 may store either uni-prediction or bi-prediction motion vectors, denoted as Mv1 and Mv2 as uni-prediction motion vectors for partition 1 and partition 2, respectively. As described, the position of each 4×4 sub-block may determine whether uni-prediction or bi-prediction motion vector is stored. In some examples, the position of the each 4×4 sub-block may also be indicative of whether a majority of the 4×4 sub-block is in the first partition or the second partition (e.g., whether a majority of the samples of the 4×4 sub-block are in the first partition or the second partition).

Partition 1 and 2 are the triangle blocks sitting respectively on the upper-right corner and lower-left corner when CUs are partitioned from top-left to lower-right (that is 45° split), and are triangle blocks sitting respectively on the upper-left corner and lower-right corner when CUs are partitioned from top-right to lower-left (that is 135° split). That is, partition 502A is partition 1 and partition 504A is partition 2 when the partition line is 45°, as illustrated in FIG. 5A, and partition 502B is partition 1 and partition 504B is partition 2 when the partition line is 135°, as illustrated in FIG. 5B. Although the example is described with respect to triangle partitions with 45° or 135° partition lines, the techniques are not so limited. The example techniques may be applicable to examples where there are not triangle partitions, such as in various examples of the GEO mode. Even in such examples of the GEO mode, there may be a first partition (e.g., partition 1) and a second partition (e.g., partition 2).

If a 4×4 unit (e.g., sub-block) is located in the non-weighted area shown in the examples of FIGS. 8A and 8B, either Mv1 or Mv2 is stored for that 4×4 unit. For example, in FIGS. 8A and 8B, where a non-weighted sample from the first prediction block or the second prediction block is the sample in the final prediction block, video encoder 200 and video decoder 300 may select either Mv1 (e.g., first motion vector) or Mv2 (e.g., second motion vector). Otherwise, if the 4×4 unit is located in the weighted area, a bi-prediction motion vector is stored. The bi-prediction motion vector is derived from Mv1 and Mv2 according to the following process:
   a. If Mv1 and Mv2 are from different reference picture lists (one from L0 and the other from L1), then Mv1 and Mv2 are simply combined to form the bi-prediction motion vector. That is, the motion vector information for the sub-block includes both Mv1 and Mv2 (i.e., both first motion vector and second motion vector).
   b. Otherwise, if Mv1 and Mv2 are from the same list, only Mv2 is stored (i.e., only the second motion vector is stored).

Figure 9:
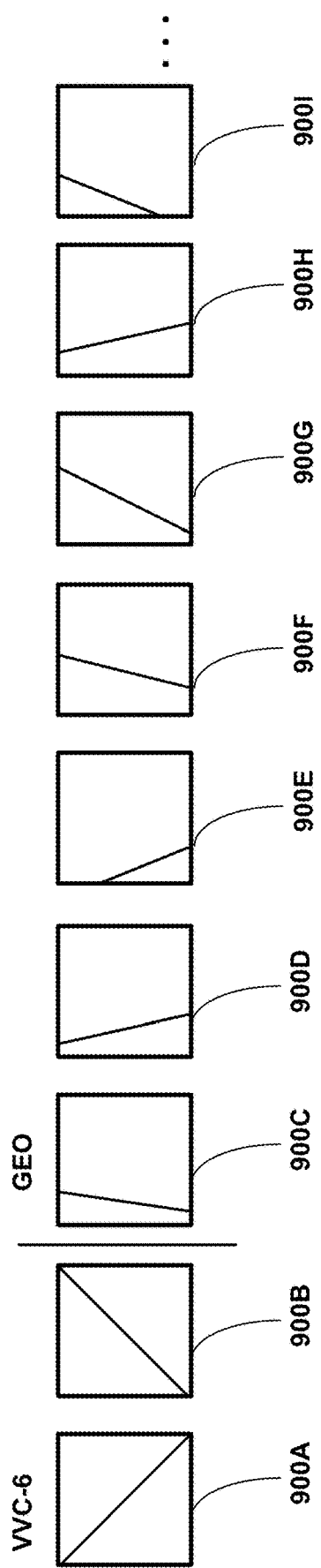
FIG. 9 is a conceptual diagram illustrating an example of triangle partition mode (TPM) as applied to geometric partition mode (GEO).

The following describes geometric partitioning. Geometric partitioning was introduced in JVET-O0489 (Esenlik, et al. "Non-CE4: Geometrical partitioning for inter blocks" Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019) as a proposed extension to the non-rectangular partitioning introduced by TPM. As introduced in JVET-O0489, the geometric partition mode (GEO) is applied only to CUs coded in skip or merge mode, but not in MMVD or CIIP mode. For a CU satisfying those conditions, a flag is signalled to indicate whether GEO is applied or not. FIG. 9 illustrates TPM in VVC-6 (VVC Draft 6) and additional shapes proposed for non-rectangular inter blocks.

For example, FIG. 9 illustrates blocks 900A and 900B that are partitioned in TPM mode. TPM mode may be considered as a subset of GEO mode. In TPM, the partition line extends from one corner to the diagonally opposite corner of the block, as shown with blocks 900A and 900B. However, in GEO mode, generally, a partition line is a diagonal, and need not necessarily start from a corner or end in a corner of the block. Blocks 900C-900I in FIG. 9 illustrate different examples of partition lines that do not necessarily start or end in a corner of blocks 900C-900I.

Figure 10:
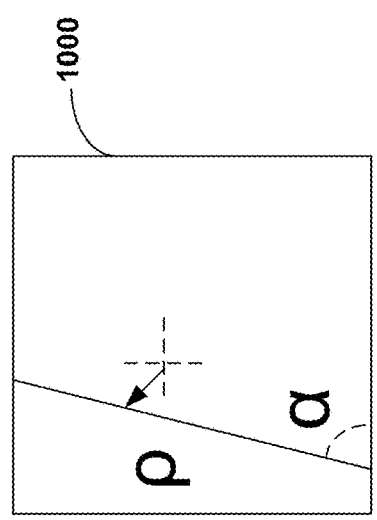
FIG. 10 is a conceptual diagram illustrating an example of GEO partitioning signaling.

Overall number of GEO partitioning may be 140. For example, FIG. 9 illustrates blocks 900A-900I, but there may be 140 such possible ways to partition a block, which may be desirable for flexibility for determining how to partition but may increase signalling. There may be additional signalling (e.g., as illustrated in FIG. 10) for GEO such as the angle α, and separation line displacement relatively to the center of the block ρ. This example, α and ρ together define the location and slope of the partition line of block 1000 in FIG. 10. In some examples, α represents a quantized angle between 0 and 360 degrees, with 11.25 degrees of separation and ρ represents a distance with 5 different values (e.g., 5 displacements). The values α and ρ pairs are stored in a table of size 140×(3+5)/8=140 bytes. For example, with 11.25 degrees of separation, there may be 32 angles (e.g., 11.25*32=360). With 5 displacement values, there may be 160 modes, where one mode is a combination of one angle and one displacement (e.g., 32*5=160). It may be possible to remove certain redundant modes, like angle of 0 with displacement of 0 and angle of 180 with displacement of 0, which give the same result. By removing redundant modes, the number of modes is 140. If it takes 3 bits to store the 5 displacement values and 5 bits to store the 32 angle values, then there is a total of 140*(3+5) bits that, upon being divided by 8 bits per byte, results in 140 bytes.

In some examples, video encoder 200 may signal an index into the table, and video decoder 300 may determine the α and ρ values. Based on the α and ρ values, video decoder 300 may determine the partition line through a block, such as block 1000 of FIG. 10.

Similar to TPM, GEO partitioning for inter-prediction is allowed for un-predicted blocks not smaller than 8×8 in order to have the same memory bandwidth with bi-predicted blocks at decoder side (e.g., video decoder 300). Motion vector prediction for GEO partitioning may be aligned with TPM.

The following Table 1 describes mode signaling. According to the techniques described in WET-O0489, the GEO mode is signalled as an additional merge mode.

TABLE 1

| Syntax elements introduced by the proposal |
|---|
| if (cbWidth >= 8 && cbHeight >= 8 ){<br>   geo_flag[ x0 ][ y0 ]<br>}<br>if (geo_flag[ x0 ][ y0 ]) {<br>   geo_partition_idx[ x0 ][ y0 ]<br>   geo_merge_idx0[ x0 ][ y0 ]<br>   geo_merge_idx1[ x0 ][ y0 ]<br>} |

The geo_merge_idx0 and geo_merge_idx1 are coded using the same CABAC contexts and binarization as TPM merge indices. The geo_partition_idx indicates the partition mode (out of 140 possibilities) and is coded using truncated binary binarization and bypass coding. For instance, geo_partition_idx is the index described above to determine the α and ρ values used to determine the partition line, as illustrated in FIG. 10.

When GEO mode is not selected, it is possible to select the TPM. The partitions of the GEO mode do not include partitions that can be obtained by TPM of binary splitting. In a way, the proposed signalling in WET-0049 scheme is similar to intra mode singalling where the TPM partitions correspond to most probable partitions and GEO modes correspond to remainder partitions. The geo_partition_idx is used as an index to the lookup table that stores the α and ρ pairs. As described above, 140 bytes are used to store this table.

The following describes blending operation for luma block. As in the case of TPM, the final prediction of the coding block is obtained by weighted averaging of first uni-prediction and second uni-prediction according to sample weights.

sampleWeightL[x][y]=GeoFilter[distScaled] if distFromLine<=0
   sampleWeightL[x][y]=8−GeoFilter[distScaled] if distFromLine>0

Where sample weights are implemented as a lookup table as in Table 2 as follows:

TABLE 2

| | blending filter weights | | | | | | | | | | | | | | |
|---|---|---|---|---|---|---|---|---|---|---|---|---|---|---|---|
| distScaled | 0 | 1 | 2 | 3 | 4 | 5 | 6 | 7 | 8 | 9 | 10 | 11 | 12 | 13 | 14 |
| GeoFilter[distScaled] | 4 | 4 | 5 | 5 | 5 | 5 | 6 | 6 | 6 | 6 | 7 | 7 | 7 | 7 | 8 |

The number of operations necessary for calculation of the sample weight is on the order of one addition operation per sample, which has similar computational complexity as TPM. In more detail, for each sample, distScaled is calculated according to the following two equations:

distFromLine=((x<<1)+1)*Dis[displacementX]+
((y<<1)+1))*Dis[displacementY]-rho distScaled=min((abs(distFromLine)+8)>>4,14)

where the variable rho, displacementX and displacementY are calculated once per coding block, and Dis[ ] is a lookup table with 32 entries (8 bits resolution) that stores cosine values. distFromLine can be calculated by incrementing for each sample with a value of 2*Dis[displacementX] in a sample row and with a value of 2*Dis[displacementX] from one sample row to the next. Slightly more than 1 addition per sample may be utilized to obtain distFromLine value. Additionally, minimum, absolute value and downshift operations may be utilized, which do not introduce any considerable complexity.

All operations of GEO may be implemented using integer arithmetic. The computational complexity of GEO may be very similar to TPM. There are additional details regarding the blending operation in the draft specification modifications document, e.g., in section "8.5.7.5 Sample weight derivation process for geometric partitioning merge mode," that is provided with WET-00489.

The following describes blending operation for chroma blocks. The sample weights calculated for the luma samples are subsampled and are used for chroma blending without any computation. The chroma sample weight at coordinate (x,y) is set equal to luma sample weight at coordinate (2x,2y), with respect to the top-left sample of luma block.

The following describes motion vector derivation. Same merge list derivation process that is used for TPM is used for deriving motion vectors of each partition of the GEO block. Each partition may be predicted only by uni-prediction.

The following describes one example technique for motion vector storage. Luma sample weights (which are calculated according to description of blending along the triangle partition edge as illustrated in FIGS. 8A and 8B), at the four corners of a 4×4 motion storage unit, are summed up. The sum is compared with two thresholds to decide whether one of two uni-prediction motion information or bi-prediction motion information is stored. The bi-prediction motion information is derived using the same process as TPM.

Stated another way, in some techniques, video encoder 200 and video decoder 300 may divide a current block into sub-blocks (e.g., 4×4 sub-blocks). For each sub-block, video encoder 200 and video decoder 300 may determine the sample weights used for scaling for the samples in the first prediction block and second prediction block. For example, referring back to FIG. 8A, there may be a 4×4 sub-block in the top-left corner of block 800A. This 4×4 sub-block includes a sample in the top-left corner, with a sample weight of 4, indicating that a sample in the first prediction block co-located with the position of the top-left sample in block 800A and a sample the second prediction block similarly co-located are scaled the same (e.g., 4/8*P1+4/8*P2, as shown in FIG. 8A). This 4×4 sub-block includes a sample in the bottom-left corner, with a sample weight of 1, indicating that a sample the first prediction block collocated with the sample in the bottom-left corner of the 4×4 sub-block is scaled by 1/8 and a sample in the second prediction block, similarly co-located, is scaled by 7/8. This 4×4 sub-block includes a sample in the top-right corner, with a sample weight of 7, indicating that a sample the first prediction block collocated with the sample in the top-right corner of the 4×4 sub-block is scaled by 7/8 and a sample in the second prediction block, similarly co-located, is scaled by 1/8, as illustrated in FIG. 8A. This 4×4 sub-block includes a sample in the bottom-right corner, with a sample weight of 4, indicating that a sample in the first prediction block collocated with the sample in the bottom-right corner of the 4×4 sub-block is scaled by 4/8 and a sample in the second prediction block, similarly co-located, is scaled by 4/8, meaning that the samples in the first prediction block and the second prediction block are scaled by the same amount.

In this example, video encoder 200 and video decoder 300 may sum the weights for the four corners of the 4×4 sub-block, which is 4+7+1+4=16. Video encoder 200 and video decoder 300 may compare the resulting value (e.g., 16) to two thresholds to determine whether video encoder 200 and video decoder 300 are to store a first motion vector that identifies the first prediction block, a second motion vector that identifies the second prediction block, or both the first and second motion vectors as the motion vector information for the 4×4 sub-block.

In accordance with the techniques, rather than or in addition to summing the luma sample weights as described above, video encoder 200 and video decoder 300 may determine a set of sub-blocks that each include at least one sample that corresponds to a prediction sample in the final prediction block that was generated based on equal weighting of a sample in the first prediction block and a sample in the second prediction block. As one example, video encoder 200 and video decoder 300 may determine a set of sub-blocks (e.g., 4×4 sub-blocks) that each include at least one sample having a weight of 4. As described above, if a sample has a weight of 4, then video encoder 200 may scale a co-located sample in the first prediction block by 4/8 (½) and scale a co-located sample in the second prediction block by 4/8 (½) to generate a prediction sample in final prediction block.

In this way, summing of weights on corners of sub-blocks and comparing to thresholds, as done in some other techniques described above, may not be needed. Rather, video encoder 200 and video decoder 300 determine whether a sub-block includes a sample for which a prediction sample in the final prediction block was generated based on equal weighting of a sample in the first prediction block and a sample in the second prediction. If a sub-block includes such a sample, video encoder 200 and video decoder 300 may store a bi-prediction motion vector, and if a sub-block does not include such a sample, video encoder 200 and video decoder 300 may store a uni-prediction motion vector.

As described above, a bi-prediction motion vector is not necessarily two motion vectors. Rather, video encoder 200 and video decoder 300 may perform certain operations to determine the bi-prediction motion vector. As one example, video encoder 200 and video decoder 300 may determine whether the first motion vector that identifies the first prediction block and the second motion vector that identifies the second prediction block are from different reference picture lists, and one of store both the first motion vector and the second motion vector for the sub-block based on the first motion vector and the second motion vector being from different reference picture lists, or select one of the first motion vector or the second motion vector based on the first motion vector and the second motion vector being from the same reference picture list, and store the selected one of the first motion vector or the second motion vector for the sub-block.

The uni-prediction motion vector may be one of the first motion vector or the second motion vector. For example, video encoder 200 and video decoder 300 may determine a sub-block that does not include any samples that correspond to prediction samples in the final prediction block that were generated based on equal weighting of samples in the first prediction block and samples in the second prediction block (e.g., the sample weight for none of the samples in the sub-block is 4). In this example, video encoder 200 and video decoder 300 may determine, for the sub-block, whether a majority of the sub-block is within the first partition or the second partition, and store, for the sub-block, the first motion vector based on the majority of the sub-block being within the first partition or the second motion vector based on the majority of the sub-block being within the second partition.

By storing motion vector information utilizing the example techniques described in this disclosure, video encoder 200 and video decoder 300 may store motion vector information that provides overall coding and visual gains. For example, the motion vector information stored for each of the sub-blocks may impact the strength of the deblock filtering. With the example techniques described in this disclosure, the motion vector information for the sub-blocks may result in determining the strength of the deblock filtering that removes artifacts. Also, the motion vector information stored for each of the sub-blocks may impact the candidate list generated for merge mode or AMVP mode for coding a subsequent block. With the example techniques described in this disclosure, the motion vector information for the sub-blocks may be better candidates for the candidate list than other techniques for generating candidates for the candidate list.

Figure 11:
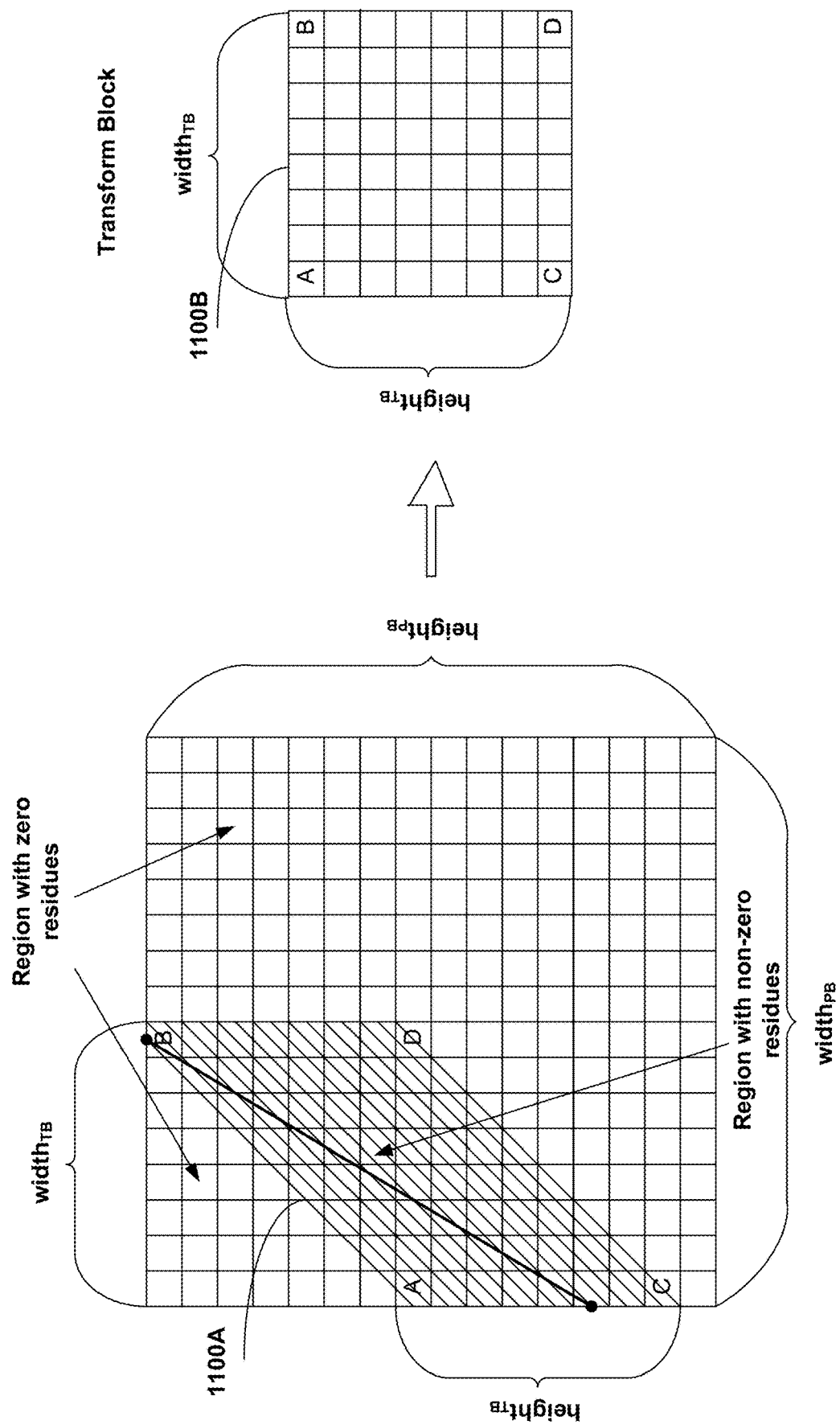
FIG. 11 is a conceptual diagram illustrating an example of partial transform for GEO predicted inter-prediction blocks.

The following describes partial transform for GEO. Since GEO partitioning provides flexibility for inter-prediction, even objects with complicated shapes may be predicted well; so the residual is smaller compared to rectangular or just triangular blocks. In some cases, non-zero residual for GEO blocks is observed only around an inner boundary, as illustrated in FIG. 11. Some techniques to reduce the residual include setting the size or W×H blocks to either W×(H/n) or (W/n)×H, keeping the non-zero residual only around the inner boundary, as illustrated by reference numeral 1100A in FIG. 11. For example, the area captured by reference numeral 1100A may be reoriented to form rectangular block 1100B, as shown in FIG. 11. With this change, residual size to be processed and number of coefficients to be signalled may become n times smaller. The value of n is signaled within the bitstream, and could be equal to 1 (when partial transform is not applied), 2 or 4. In some examples, the partial transform, an example of which is illustrated in FIG. 11, may be applied only to GEO and TPM blocks.

The following describes residual propagation for partial transform. On top of partial transform, a process acting like a form of deblocking is applied.

This deblocking operation could be described as follows:
Fetch a sample p on a block boundary that is marked by a black circle
Assign value of (p>>k) to samples at position (x, y−k) if k<=3
Fetch a sample p on a block boundary that is marked by a white circle
Assign value of (p>>k) to samples at position (x, y+k) if k<=3.

Figure 12:
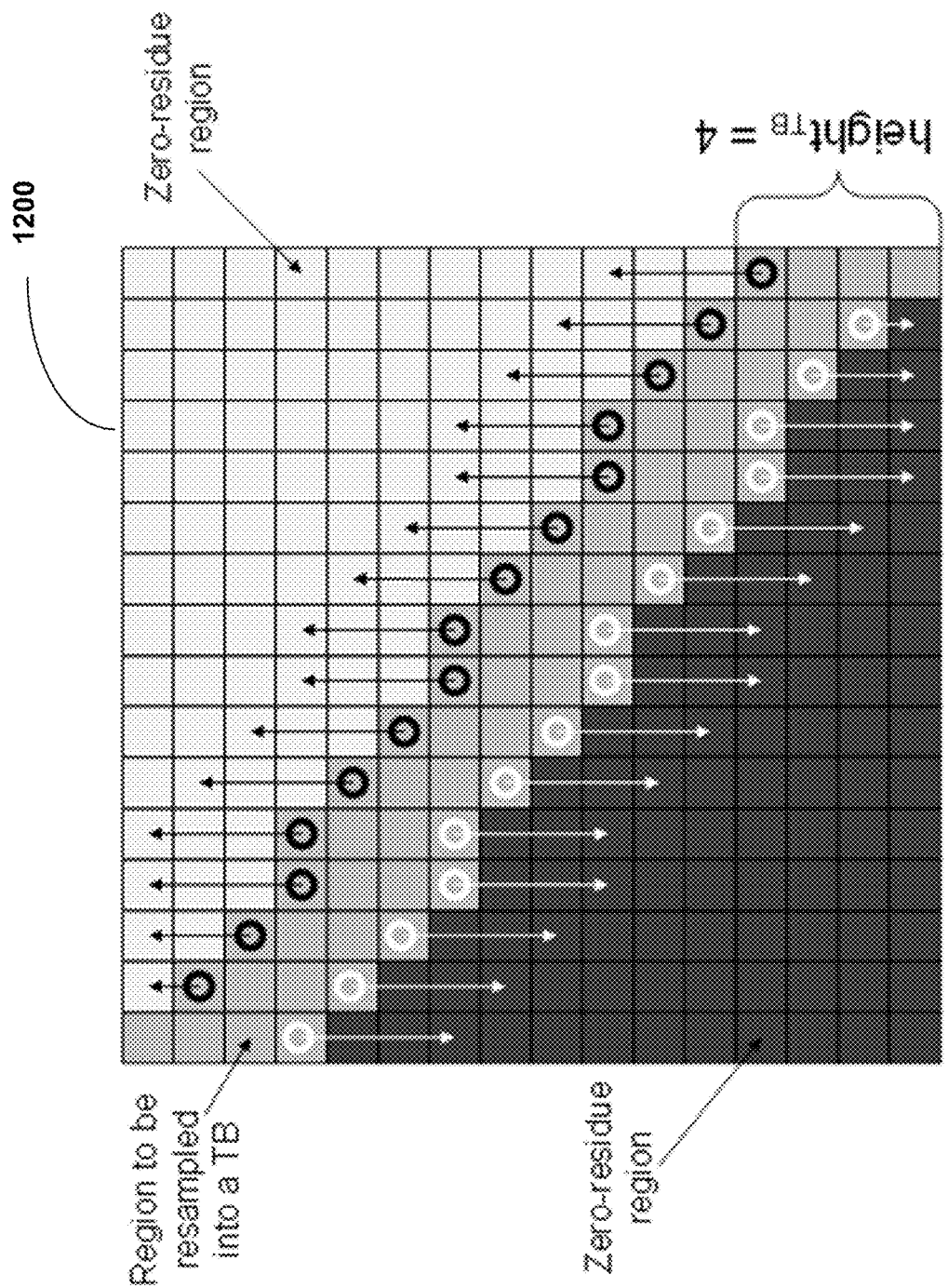
FIG. 12 is a conceptual diagram illustrating an example of a deblocking-like process of partial transform.

FIG. 12 provides examples for the value of k. The value of k is the number of samples between a boundary sample (denoted by a circle) in block 1200 and a populated sample (that is under the corresponding arrow) in block 1200. Black and white arrows show the direction of deblocking for upper and lower boundaries.

There may be certain problems with GEO design. For example, the current GEO design may be treated as an extension to TPM. However, there are some differences in the design which are desirable to be harmonized for implementation.

The following describes issues with harmonization of TPM and GEO motion field storage. The TPM algorithm for motion field storage only uses the position of a 4×4 unit within the CU to determine which motion vector needs to be stored, while the GEO method uses the weights used for motion compensation for the storage. Moreover, if the current algorithm for motion field storage of GEO were to be applied to TPM, the TPM storage would end up modified. It may be preferable to have a unified method of storage for both methods. This disclosure describes example techniques for storing motion field (e.g., the motion vector information).

The following describes issues with harmonization of TPM and GEO weights derivation. The GEO algorithm for weight derivation, described above with respect to blending operation for luma block, is different from the one used for TPM weight derivation. It may be preferable to have a unified method for weight derivation for both methods.

The following describes issues with partial transform. Current GEO techniques have on option of partial transform with the residual filtering applied after an inverse partial transform. The current GEO techniques utilize the transform module which may also add an additional stage in the implementation. In one example, α vertical residual filtering may not be able to be performed "on the fly" (i.e., right after the inverse transform) since reading in a vertical direction may require more reads from the buffer and cannot be simply done while copying the residual from the transform output block into the residual block. In this case an extra stage in the implementation may be needed.

Figure 13:
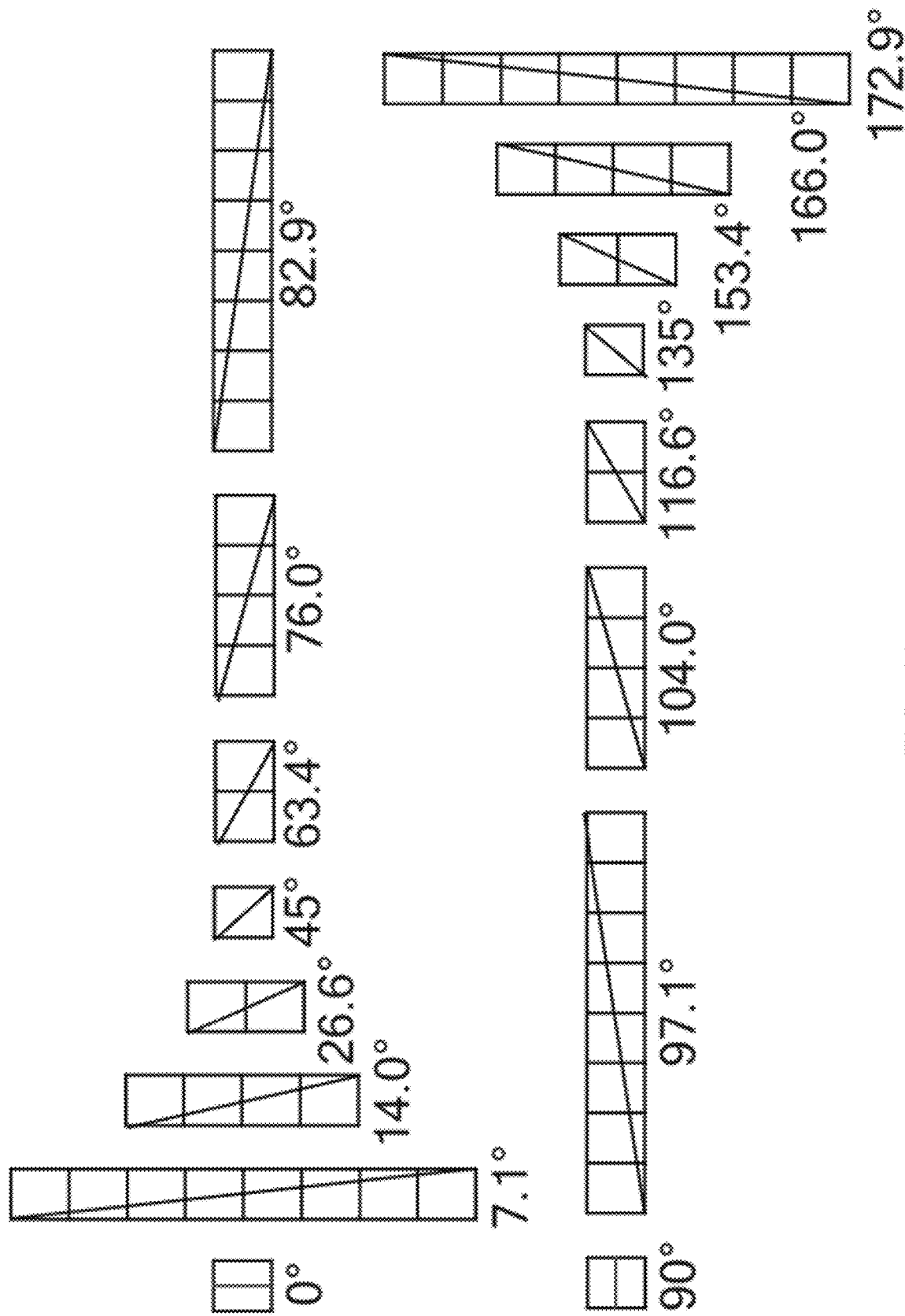
FIG. 13 is a conceptual diagram illustrating examples of angles for GEO including the TPM angles plus 0° and 90° angles.

This disclosure describes example techniques for unifying the motion field storage and motion weight derivation of TPM and GEO. As one example, the following describes changes of GEO angles. In some examples, the angles used for GEO can be changed to be harmonized with the existing TPM angles. The available angles for GEO would become the ones illustrated in FIG. 13, which can be described with an approximated angle value in degrees or radians, or with exact integer ratio of width/height as each angle goes from corner pixel to corner pixel of each block. The 0° and 90° angles can also be added to provide more diversity.

The following describes changes of GEO motion weight derivation. In some examples, the weights used for the blending part in GEO can be changed so that they use the TPM weight process as described above for blending along the triangle partition edge, and so that both GEO and TPM have harmonized weight derivation process. Given the starting point with coordinates (s.x; s.y) and the end point of an edge with coordinates (e.x; e.y), the bounding box can be identified for the edge (dashed rectangle in FIG. 14), i.e., with top left coordinates (b.x; b.y)=(min(s.x, e.x); (min(s.y, e.y)) and of size abs(s.x−e.x) times abs(s.y−e.y).

Figure 14:
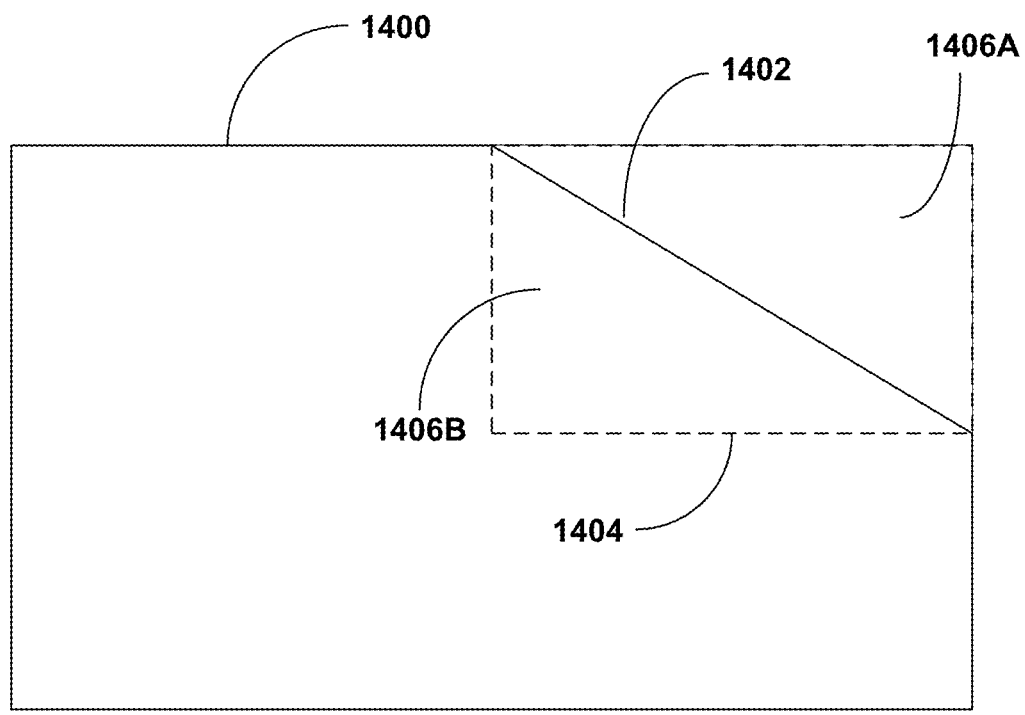
FIG. 14 is a conceptual diagram illustrating an example of GEO mode with a bounding box shown in dashed lines.

For instance, FIG. 14 illustrates block 1400 that is partitioned with partition line 1402. Video encoder 200 and video decoder 300 may determine weights used to blend the two partitions of block 1400. Again, the weights may indicate how much to scale a sample from a first prediction block identified by a first motion vector for a first partition and how much to scale a sample from a second prediction block identified by a second motion vector for a second partition (e.g., as illustrated in FIGS. 8A and 8B).

In the example of FIG. 14, to determine the weights, video encoder 200 and video decoder 300 may determine a bounding box 1404, where one corner of bounding box 1404 is one end of partition line 1402, and the diagonally opposite corner of bounding box 1404 is the other end of partition line 1402, as illustrated in FIG. 14. As illustrated, partition line 1402 then divides bounding box 1404 into partition 1406A and partition 1406B. Video encoder 200 and video decoder 300 may then determine motion vectors for partitions 1406A and 1406B, determine prediction blocks for partitions 1406A and 1406B and blend the first and second prediction blocks based on the weights for bounding box 1404. In some examples, the weights for bounding box 1404 may be similar to those of FIGS. 8A and 8B. Again, the weights indicate an amount by which to scale a sample in the first prediction block and an amount by which to scale a sample in the second prediction block to generate the final prediction block.

By using TPM angles for GEO, the TPM weight computation can be applied directly to the bounding box (e.g., similar to FIGS. 8A and 8B). One difference may be for video encoder 200 and video decoder 300 to add an offset (b.x; b.y) to the starting position of the weighting calculation. In some examples, the blending area can be extended to outside of the bounding box.

The weights for 0° and 90° angles can be computed by using an offset of 0 or 'infinity' in the TPM weight computation. In some examples, the computing of the weights can be done by using width/height ratio of 0 for 0° angle and of 2*MAX_CU_SIZE for 90° angle. The existing weighting calculation of TPM can also be changed. For example, in some examples, the blending area used for TPM weights can be reduced to have sharper weights, such as in FIG. 15B. FIG. 15A illustrates existing TPM weights for width/height ratio equal to 4, and FIG. 15B illustrates an example of different weights for the same angle.

In some examples, the weights can be modified in the following manners:
 a. TPM weight derivation can be changed to use the GEO weight derivation described in the previous sections;
 b. GEO weights derivation can be made to use TPM chroma weight derivation, while TPM still uses its luma weight derivation;
 c. TPM and GEO weights can be made to subsample the existing weights used for TPM, to have a smaller blending area; and
 d. TPM and GEO weights can be made to subsample the existing weights used for TPM, to have a smaller blending area for specific angles or combinations of angles and block sizes (e.g., if an angle supposed to be used for a high width/height ratio is used for a block with a small width/height ratio).

Figure 15:
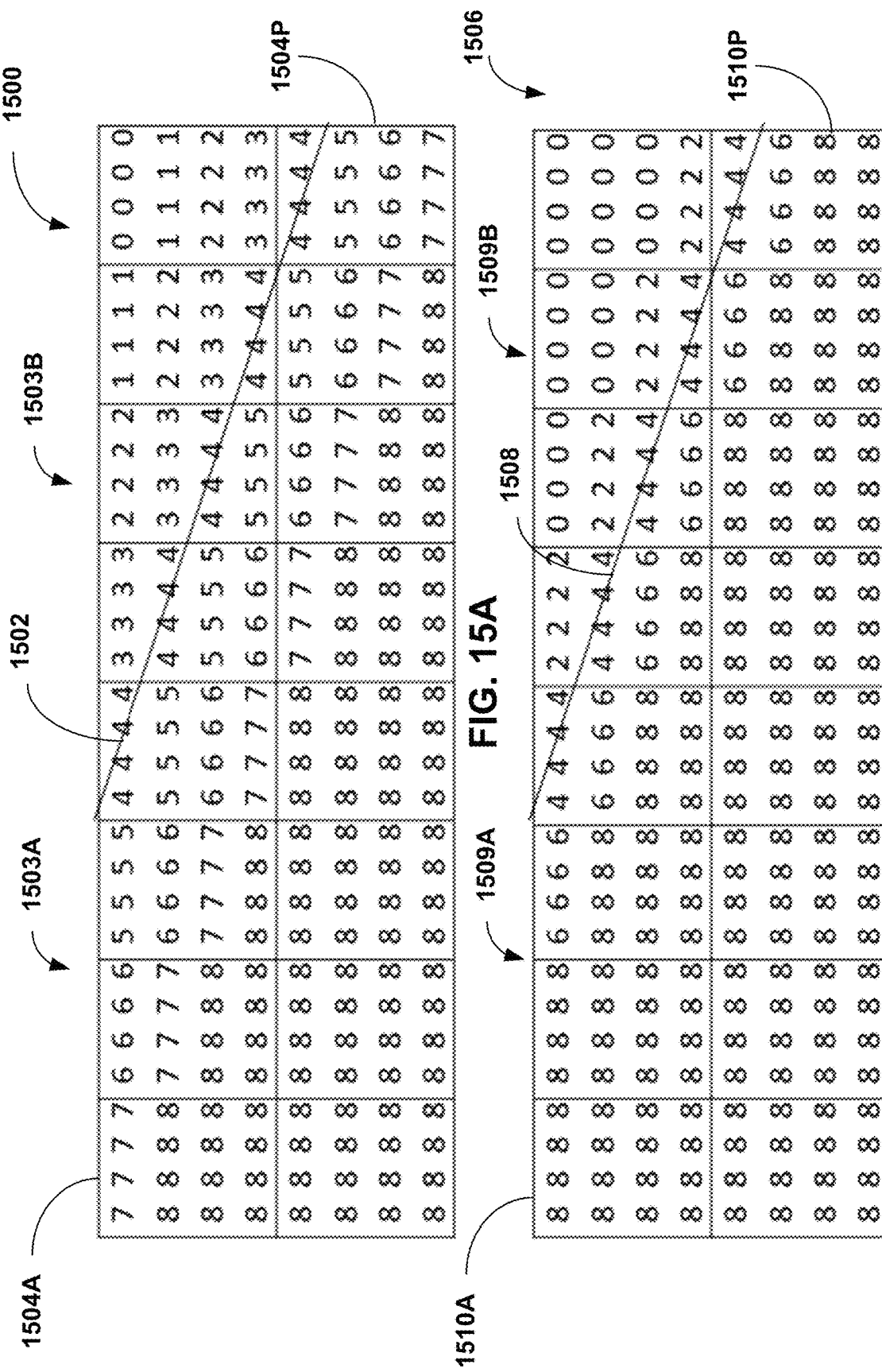
FIGS. 15A and 15B are conceptual diagrams illustrating examples of weights applied for TPM.

For example, FIG. 15A illustrates block 1500, which is a 32×8 sized block, and is partitioned by partition line 1502 to partition block 1500 into partition 1503A and partition 1503B. In one or more examples, video encoder 200 and video decoder 300 may divide block 1500 includes sub-blocks (e.g., 4×4 sub-blocks), as illustrated by sub-blocks 1504A-1504P. As illustrated, each sample in each sub-block may be associated with a weight indicative of an amount to scale samples in the first prediction block and an amount to scale samples in the second prediction block to generate a final prediction block.

For instance, for sub-block 1504A, video encoder 200 and video decoder 300 may determine that for the first top-left sample of sub-block 1504A, video encoder 200 and video decoder 300 scale a co-located sample in the first prediction block by 7/8 and scale a co-located sample in the second prediction block by 1/8, and sum the resulting value as part of determining a prediction sample in the final prediction block. Video encoder 200 and video decoder 300 may determine prediction samples for each sample in block 1500 based on the weighting associated with the sample. In one or more examples, if a sample in block 1500 has a weight of 4 (e.g., top-left sample in sub-block 1504P), then video encoder 200 and video decoder 300 may equally scale co-located samples in the first and second prediction blocks (e.g., scale by 4/8 or ½ each of the co-located samples).

The same techniques may be applicable to block 1506 of FIG. 15B. For example, block 1506 is a 32×8 sized block, and is partitioned by partition line 1508 to partition block 1506 into partition 1509A and partition 1509B. In one or more examples, video encoder 200 and video decoder 300 may divide block 1506 into sub-blocks (e.g., 4×4 sub-blocks), as illustrated by sub-blocks 1510A-1510P. As illustrated, each sample in each sub-block may be associated with a weight indicative of an amount to scale samples in the first prediction block and an amount to scale samples in the second prediction block to generate a final prediction block.

For instance, for sub-block 1510A, video encoder 200 and video decoder 300 may determine that for the first top-left sample of sub-block 1510A, video encoder 200 and video decoder 300 scale a co-located sample in the first prediction block by 8/8 and scale a co-located sample in the second prediction block by 0/8, and sum the resulting value as part of determining a prediction sample in the final prediction block. In this example, the second prediction block does not contribute in the generation of the final prediction block. Video encoder 200 and video decoder 300 may determine prediction samples for each sample in block 1506 based on the weighting associated with the sample. In one or more examples, if a sample in block 1506 has a weight of 4 (e.g., top-left sample in sub-block 1510P), then video encoder 200 and video decoder 300 may equally scale co-located samples in the first and second prediction blocks (e.g., scale by 4/8 or ½ each of the co-located samples).

The following describes changes in GEO motion field storage. In particular, video encoder 200 and video decoder 300 may be configured to store motion vector information for each of sub-blocks 1504A-1504P and 1510A-1510P. For example, video encoder 200 and video decoder 300 may determine a first motion vector for first partition 1503A and a second motion vector for second partition 1503B. Video encoder 200 and video decoder 300 may determine the first prediction block based on the first motion vector and determine the second prediction block based on the second motion vector. Video encoder 200 and video decoder 300 may generate the final prediction block by blending the first prediction block and the second prediction block using the weights illustrated in FIG. 15A. Video encoder 200 and video decoder 300 may perform similar operations to determine final prediction block for block 1506 of FIG. 15B.

In addition, video encoder 200 and video decoder may determine the motion vector information (e.g., motion field) that is stored for each of sub-blocks 1504A-1504P and 1510A-1510P and utilized for future coding operations such as deblock filtering or candidate list for merge mode or AMVP mode for coding a subsequent block. The following describes examples of ways to determine the motion vector information that is stored for sub-blocks 1504A-1504P and 1510A-1510P.

In some examples, the motion field storage of GEO can be modified in the following way, so that both TPM and GEO use the same motion storage:
  a. In some examples, a search can be made inside each 4×4 unit of the weight map to use biMv motion vector if and only if a '4' is found inside the block.
  b. In some examples, a similar process as used for the weights, described above with respect to change of GEO angles, can be used, using the TPM storage for blocks of the size of the bounding box with an offset of (b.x; b.y).
  c. In some examples, the starting point of the weighted area can be found using (b.x; b.y) to store a biMv to the corresponding 4×4 unit, and an offset (o.x; o.y) is determined by the slope of the angle used, from the width/height ratio of the angles. For example, the angles as presented in FIG. 13 can be described from the ratio:
    {0:1; 1:8; 1:4; 1:2; 1:1; 2:1; 4:1; 8:1; MAX_CU_SIZE<<1:1; −8:1; −4:1; −2:1; −1:1; −1:2; −1:4; −1:8}
    which would lead to the offset (o.x; o.y) being equal to:
    {(0;1); (1;8); (1;4); (1;2); (1;1); (2;1); (4;1); (8;1); (MAX_CU_SIZE<<1;1); (−8;1); (−4;1); (−2;1); (−1; 1); (−1;2); (−1;4); (−1;8)}
    or, with more generic angles:
    o.x=(a !=90) ? max(1, abs(tan(a))): MAX_CU_SIZE<<1;
    o.x=(a 0) ? 0: (a>90) ?−o.x: o.x;
    o.y=(a %90 !=0) ? max(1, 1/tan(a)): 1;
    where a is equal to the angle used, in degrees, modulo 180°.

The points (b.x+i*o.x; b.y+i*o.y) are identified and video encoder 200 and video decoder 300 store a biMv to the 4×4 unit that contains at least one of those points.

As described above, video encoder 200 and video decoder 300 may search each 4×4 sub-block of the weight map to use biMv motion vector if and only if a '4' is found inside the block. As also described above, a weight of '4' for a sample may mean that video encoder 200 and video decoder 300 scaled co-located samples in the first prediction block and the second prediction block by equal weighting (e.g., 4/8*P1+4/8*P2, where P1 refers to a sample in the first prediction block and P2 refers to sample in the second prediction block). Stated another way, video encoder 200 and video decoder 300 may determine a set of sub-blocks (e.g., in sub-blocks 1504A-1504P and 1510A-1510P) that each include at least one sample that corresponds to a prediction sample in the final prediction block that was generated based on equal weighting of a sample in the first prediction block and a sample in the second prediction block. Examples of such sub-blocks include any one of sub-blocks 1504A-1504P and 1510A-1510P that each include at least one sample with weight of 4.

In one or more examples, video encoder 200 and video decoder 300 may store respective bi-prediction motion vectors for each sub-block in the determined set of sub-blocks. For example, video encoder 200 and video decoder 300 may determine whether the first motion vector and the second motion vector are from different reference picture lists, and one of store both the first motion vector and the second motion vector for each sub-block of the set of sub-blocks based on the first motion vector and the second motion vector being from different reference picture lists, or select one of the first motion vector or the second motion vector based on the first motion vector and the second motion vector being from the same reference picture list, and store the selected one of the first motion vector or the second motion vector for each sub-block of the set of sub-blocks.

As an example, assume that the first motion vector (Mv1) refers to a first picture in reference picture list 1. In this example, the motion vector information for the first motion vector is L0: refIdx=−1, Mv=(0,0), L1: refIdx=1, Mv1=(x1, y1), meaning the first motion vector identifies the picture with index '1' in reference picture list 1. Assume that the second motion vector (Mv2) refers to a second picture in reference picture list 0. In this example, the motion vector information for the second motion vector L0: refIdx=2, Mv2=(x2, y2), L1: refIdx=0, Mv=(x', y'), meaning the second motion vector identifies the picture with index '2' in reference picture list 0. In this example, because Mv1 and Mv2 refer to pictures in different reference picture lists, video encoder 200 and video decoder 300 may combine the motion vector for storage (e.g., the stored motion vector information may be L0: refIdx=2, Mv2=(x2,y2), L1: refIdx=1, Mv1=(x1,y1).

However, if the first motion vector and the second motion vector refer to pictures in the same reference picture list (e.g., reference picture list 0 (L0) or reference picture list 1 (L1)), then video encoder 200 and video decoder 300 may select one of the first motion vector or the second motion vector based on the first motion vector and the second motion vector being from the same reference picture list, and store the selected one of the first motion vector or the second motion vector for each sub-block of the set of sub-blocks. As one example, video encoder 200 and video decoder 300 may be configured to always store Mv2.

The above describes example ways in which video encoder 200 and video decoder 300 may store respective bi-prediction vectors for each sub-block in the determined set of sub-blocks. The determined set of sub-blocks may be a first set of sub-blocks that each include at least one sample that corresponds to a prediction sample in the final prediction block that was generated based on equal weighting of a sample in the first prediction block and a sample in the second prediction block.

In one or more examples, video encoder 200 and video decoder 300 may determine a second set of sub-blocks that do not include any samples that correspond to prediction samples in the final prediction block that were generated based on equal weighting of samples in the first prediction block and samples in the second prediction block. Examples of such sub-blocks include any one of sub-blocks 1504A-1504P and 1510A-1510P that do not include any sample with weight of 4. Video encoder 200 and video decoder 300 may determine, for each sub-block in the second set of sub-blocks, whether a majority of the sub-block is within the first partition or the second partition, and store, for each sub-block in the second set of sub-blocks, the first motion vector based on the majority of the sub-block being within the first partition or the second motion vector based on the majority of the sub-block being within the second partition.

As described above, in some examples, the starting point of the weighted area can be found using (b.x; b.y) to store a biMv to the corresponding 4×4 unit, and an offset (o.x; o.y) is determined by the slope of the angle used, from the width/height ratio of the angles. For instance, the examples of FIGS. 15A and 15B are two examples of weights applied to samples. In some examples, for another example of weights applied to samples and another block, a partition line for this other block may have the same slope as the slope of partition line 1502 or 1508, but the starting and ending point of the partition line may be different. In such examples, the weights applied to samples in the sub-blocks for this other block may be the same as the examples illustrated in FIGS. 15A and 15B, but with an offset.

For example, the third sub-block in FIG. 15A includes samples in a first row with weights of 5, samples in a second row with weights of 6, samples in the third row with weights of 7, and samples in a fourth row with weights of 8. In some examples, if partition line 1502 were shifted over to the left by one sub-block, then the third sub-block may have the same weights as the fourth sub-block in block 1500.

In the example of FIG. 15A, in the top-row of block 1500, the motion vector that is stored for the sub-blocks may be as follows: first sub-block (e.g., sub-block 1504A), store uni-prediction motion vector since no weight '4', second sub-block, store uni-prediction motion vector since no weight '4', third sub-block, store uni-prediction motion vector since no weight '4', fourth sub-block store bi-prediction motion vector since at least one sample with weight '4', fifth sub-block store bi-prediction motion vector since at least one sample with weight '4', sixth sub-block store bi-prediction motion vector since at least one sample with weight '4', seventh sub-block store bi-prediction motion vector since at least one sample with weight '4', and eighth sub-block store uni-prediction motion vector since no weight '4'. Therefore, the motion vector storage for the sub-blocks in the first row of block 1500 may be as follows: uni-prediction, uni-prediction, uni-prediction, bi-prediction, bi-prediction, bi-prediction, bi-prediction, and uni-prediction.

If partition line 1502 were shifting one sub-block to the left, and the weights were changed as described below, the motion vector storage for the sub-blocks in the first row may be as follows: uni-prediction, uni-prediction, bi-prediction, bi-prediction, bi-prediction, bi-prediction, uni-prediction, and uni-prediction. This pattern of which sub-blocks have uni-prediction and which sub-blocks have bi-prediction motion vectors (e.g., uni-prediction, uni-prediction, bi-prediction, bi-prediction, bi-prediction, bi-prediction, uni-prediction, and uni-prediction) is the same as the above pattern of which sub-blocks have uni-prediction and which sub-blocks have bi-prediction motion vectors (e.g., uni-prediction, uni-prediction, uni-prediction, bi-prediction, bi-prediction, bi-prediction, bi-prediction, and uni-prediction) with an offset.

For partition line 1502, video encoder 200 and video decoder 300 may store a table of weights for the slope of partition line 1502 that indicates for this slope, which sub-blocks have a weight with '4' and which sub-blocks have no weight '4'. Then to determine which set of sub-blocks have a sample of the weight of '4', video encoder 200 and video decoder 300 may access the table to determine which sub-blocks have a sample with weight of '4'. For instance, video encoder 200 and video decoder 300 may store a table of weights for a slope of a partition line that partitions the current block into the first partition and the second partition. To determine the set of sub-blocks, video decoder 300 may determine the set of sub-blocks based on the stored table and an offset into the table.

Figure 16:
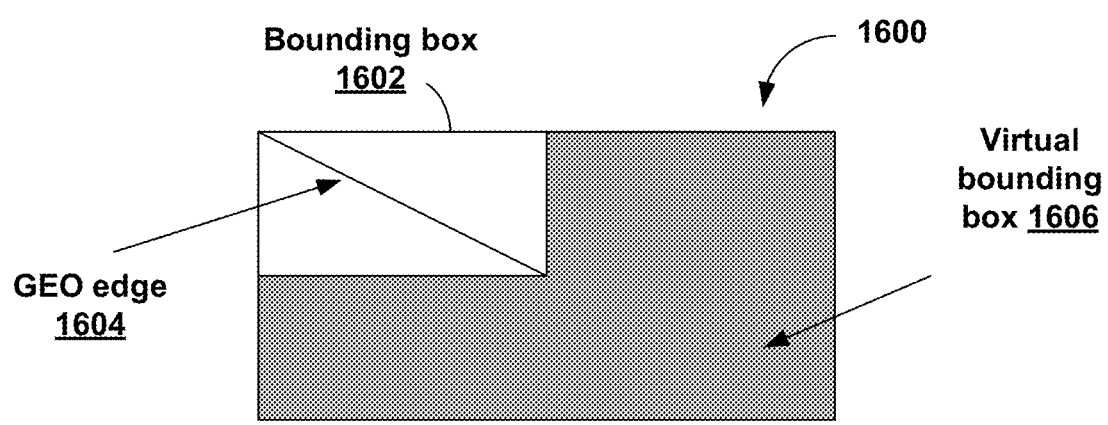
FIG. 16 is a conceptual diagram illustrating an example of GEO edge in a bounding box with a virtual bounding box that has width and height that are power of 2.

The following describes partial transform and residual propagation. In some examples, the bounding box described with respect to FIG. 14 can also be made so that the width and height are powers of 2, as illustrated in FIG. 16. For example, FIG. 16 illustrates block 1600 with bounding box 1602 and GEO edge (e.g., partition line) 1604. FIG. 16 also illustrates virtual bounding box 1606 that may have a width and height that are power of 2.

In some examples, having width and height of powers of 2 can be achieved by creating an extended virtual bounding box that has the top-left coordinate the same as the original bounding box, but the width/height is a value that is power of 2 and is larger or equal to the width/height of the original bounding box. The residual in the virtual bounding box, but not in the original bounding box, is set to zero, gray area in FIG. 16. The partial transform can be applied to the virtual bounding box.

In some examples, having width and height values that are power of 2 can be achieved by restricting the combinations of displacements and angles so that the bounding box uses always powers of 2 for width and height. The partial transform can be applied to the bounding box. When this restriction (either size is power of 2) is applied the signaling of the angle is modified to exclude other unused angles. For example, only the angles that lead to power of 2 sizes of the bounding box may be signaled.

The following techniques can be applied to the bounding block based partial transform or partial transform proposed in the original GER contribution, or to any other partial transform.

The size or amount of samples involved in the partial transform may be restricted, where the restriction can be expressed, for example, as a fraction threshold applied to the CU width and/or height or CU area. In one example, the fraction threshold can be set to ¼ of the CU size.

In some examples, the residual filtering can only be applied if, and only if, the size for the partial transform is less than or equal to a certain fraction threshold of the CU size. In one example, the fraction threshold can be set to ¼ of the CU size. In some examples, partial transform and residual propagation are only applied if the size for the partial transform is less than or equal to the fraction threshold of the CU size.

In some examples, the residual filtering is applied in one certain direction only (e.g., in a horizontal direction only). This may allow a video coder (e.g., video encoder 200 or video decoder 300) to do residual filtering "on the fly," e.g., right after the inverse transform is performed and while populating the residual buffer with the inverse transformed residual. In such case, the residual filtering is applied without accessing any residual samples in the vertical direction and avoiding writing in the vertical direction to the residual block. To accomplish this, the populating of the residual block from the inverse transform output block is done in a certain manner, for example, in the horizontal direction only.

Limiting the partial transform size and also limiting the transform size with applying residual filtering may be desired for some implementations, since if the limiting threshold is small enough then the partial transform and residual filtering may require the same processing time as doing a full transform. In such examples, no extra stage in the implementation may be introduced.

Additionally, signaling of a flag or indicator of whether partial or full transform is applied in a block may also be restricted considering the restriction of the partial transform. For example, when partial transform is not possible to be applied, i.e. restricted, the flag or indicator is not signaled, and full transform is applied. Similarly, when partial transform may not cover the edge area in full, i.e., there are samples in the edge area which are not transformed, then the partial transform may be disabled and signaling of the usage of the partial or full transform is not performed and full transform is applied. This may happen, in which case the amount of samples are not the same as the available sizes (width*height) of the transform blocks. In some cases, usually only transform with power of 2 length is supported.

In some examples, the partial transform is only applied to GEO with certain angles, for example, the angles from the set of {0°, 90°, 180°, 270°, 360°}. That is, partial transform is only applied if the split direction is horizontal or vertical.

The following describes extension of triangle merge mode angles. In some examples, the weights used in the blending process of TPM can be extended to cover an additional 40 angles per CU, where the associated weight values of each angle can be represented by using the same derivation function as for the end-to-end diagonal-splitting TPM mode (e.g., as described above with respect to triangular partitioning).

The following describes mask-based extension. The generation process of weight values for a random CU is the same as taking part of the weighting values from a predefined mask of weight values. As depicted in FIGS. 17A and 17B, the weight values of a CU can be sampled anywhere from an underlying mask (called a hypothetical CU) that corresponds to a desired angle, e.g. 45°. The underlying mask of the hypothetical CU can be changed depending on the desired angle. According to the TPM design, the supported angles cover $m*\pi+\arctan(2^n)$, where $m \in \{0, \frac{1}{2}, 1, 3/2\}$ and $n \in \{-5, -4, \ldots, 4, 5\}$. Examples of additional supported angles are illustrated in FIGS. 18A-18D.

The generation process of weight values for a hypothetical CU is a two-step process: (a) taking the weight values from a regular TPM CU to fill part of the mask of the hypothetical CU and (b) filling the rest of the mask by using the weight 0 or 8 depending on whether the rest is spatially closer to the top triangle partition or the bottom one. For example, the mask of the hypothetical CU with arctan(128/64) as plotted in FIG. 18A is formed as follows: firstly, it fills its top half by using the weight values of a 128×64 TPM CU. Then, the rest in this hypothetical CUs is filled by using the same weight value that is assigned to the bottom triangle of the 128×64 TPM CU. In another example, the mask of the hypothetical CU with arctan(64/128) as plotted in FIG. 18C is formed as follows: firstly, it fills its left half by using the weights of a 64×128 TPM CU; then, the rest in this hypothetical CUs is filled by using the same weight value that is assigned to the bottom triangle of the 64×128 TPM CU.

The following describes computation-based extension. The generation process of weight values for a random CU is the same as taking part of the weighting values from a larger hypothetical CU that is with a diagonally split edge. Given a CU of size (w)×(h), TPM already supports diagonal split with an angle of arctan(w/h). This extension is to extend the range of TPM angles to cover those as specified in FIGS. 18A-18D. These angles can be formulated as $m*\pi+\arctan(s*w/h)$, where s is an integer and $2^{-5} \leq \arctan(s*w/h) \leq 2^5$.

For example, in FIG. 19A, the weight values of a (w)×(h) CU with an angle of arctan(2w/h) are the same as taking the left half of the weight values of a (2w)×(h) hypothetical CU. In another example, as in FIG. 19B, the weight values of a (w)×(h) CU with an angle of arctan(4w/h) are the same as taking the left half of the weight values of a (4w)×(h) hypothetical CU. Thus, TPM can support more angles for each CU by using the same derivation process of weight values as for a larger one (that is, the hypothetical CU).

Similarly, when m is not zero, the weight values that are referenced from a hypothetical CU may change. Supposing the hypothetical CU is of size (W)×(H):
 a. when m=0 and W>H, the left half of the weight values of a hypothetical CU is referenced;
 b. when m=0 and W<H, the above left half of the weight values of a hypothetical CU is referenced;
 c. when m=½ and W>H, the right half of the weight values of a hypothetical CU is referenced;
 d. when m=½ and W<H, the above half of the weight values of a hypothetical CU is referenced;
 e. when m=1 and W>H, the right of the weight values of a hypothetical CU is referenced;
 f. when m=1 and W<H, the bottom of the weight values of a hypothetical CU is referenced;
 g. when m=3/2 and W>H, the left of the weight values of a hypothetical CU is referenced;
 h. when m=3/2 and W<H, the bottom of the weight values of a hypothetical CU is referenced.

A 2-dimensional offset, (dx, dy), can be added up to the coordinate of each of the CU corners to accommodate more weight-value options. Thus, the sampling of a weight value from a hypothetical CU need not start from any of the CU corners. For example, in FIG. 20, the sampling position can be shifted from the top-left CU corner to a certain position inside the hypothetical CU, and then the weight values are sampled at the position that is pointed to by a shifting offset.

Figure 21:
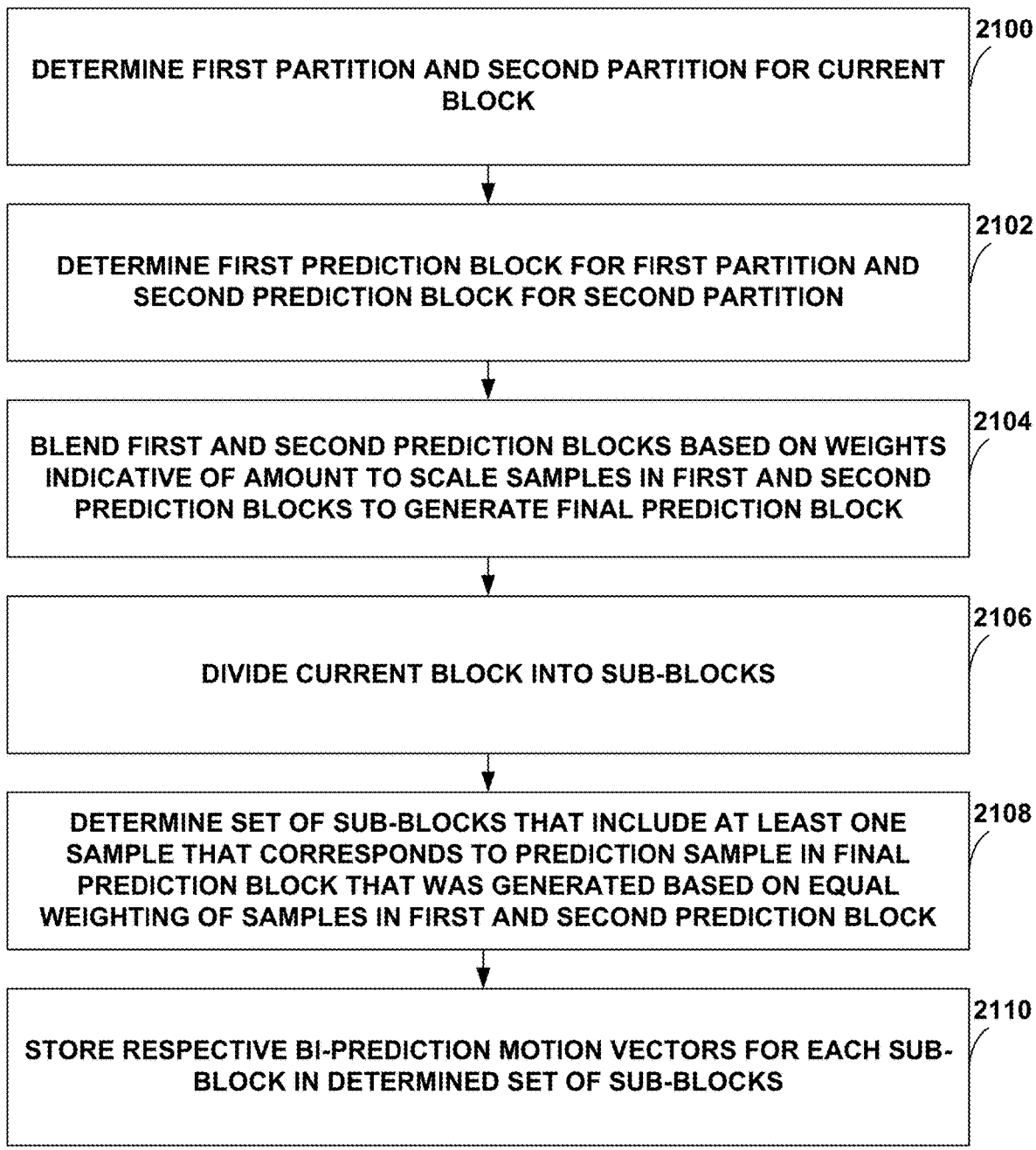
FIG. 21 is a flowchart illustrating an example method for processing video data.

FIG. 21 is a flowchart illustrating an example method for processing video data. Video encoder 200 and video decoder 300 may determine a first partition for a current block of the video data coded in geometric partition mode and a second partition for the current block of the video data (2100). Examples of the current block may be blocks 1500 or 1506 of FIGS. 15A and 15B. Examples of the first partition include partition 1503A or 1509A, and examples of the second partition include partition 1503B or 1509B.

Video encoder 200 and video decoder 300 may determine a first prediction block of the video data based on a first motion vector for the first partition and a second prediction block of the video data based on a second motion vector for the second partition (2102). For example, video encoder 200 and video decoder 300 may determine a first prediction block for partition 1503A or 1509A and a second prediction block for partition 1503B or 1509B based on respective motion vectors.

Video encoder 200 and video decoder 300 may blend the first prediction block and the second prediction block based on weights indicative of an amount to scale samples in the first prediction block and an amount to scale samples in the second prediction block to generate a final prediction block for the current block (2104). For example, FIGS. 15A and 15B illustrate examples of weights associated with samples in block 1500 or block 1506. The weights indicate the amount to scale a sample in the first prediction block and a co-located sample in the second prediction block. Video encoder 200 and video decoder 300 may generate a final prediction block by blending samples in the first and second prediction blocks based on the weights (e.g., as illustrated in FIGS. 15A and 15B).

Video encoder 200 and video decoder 300 may divide the current block into a plurality of sub-blocks (2106). For example, video encoder 200 and video decoder 300 may divide block 1500 into 4×4 sized sub-blocks 1504A-1504P, and divide block 1506 into 4×4 sized sub-blocks 1510A-1510P.

Video encoder 200 and video decoder 300 may determine a set of sub-blocks that each include at least one sample that corresponds to a prediction sample in the final prediction block that was generated based on equal weighting of a sample in the first prediction block and a sample in the second prediction block (2108). For example, in FIG. 15A, the set of sub-blocks may include third, fourth, fifth, sixth sub-block in top row of block 1500 and the last sub-block (e.g., sub-block 1504P) in block 1500, since each of these sub-blocks includes at least one sample associated with weight of '4'.

Video encoder 200 may store respective bi-prediction motion vectors for each sub-block in the determined set of sub-blocks (2110). For example, video encoder 200 and video decoder 300 may determine whether the first motion vector and the second motion vector are from different reference picture lists and one of store both the first motion vector and the second motion vector for each sub-block of the set of sub-blocks based on the first motion vector and the second motion vector being from different reference picture lists, or select one of the first motion vector or the second motion vector based on the first motion vector and the second motion vector being from the same reference picture list, and store the selected one of the first motion vector or the second motion vector for each sub-block of the set of sub-blocks.

In some examples, the set of sub-blocks may be a first set of sub-blocks. Video encoder 200 and video decoder 300 may be configured to determine a second set of sub-blocks that do not include any samples that correspond to prediction samples in the final prediction block that were generated based on equal weighting of samples in the first prediction block and samples in the second prediction block. Examples of such sub-blocks include the first, second, third, and last sub-blocks in the top row of block 1500 and the first, second, third, fourth, fifth, sixth, and seventh sub-blocks in the bottom row of block 1500, since none of these sub-blocks include a sample associated with weight of '4'. Video encoder 200 and video decoder 300 may determine, for each sub-block in the second set of sub-blocks, whether a majority of the sub-block is within the first partition or the second partition, and store, for each sub-block in the second set of sub-blocks, the first motion vector based on the majority of the sub-block being within the first partition or the second motion vector based on the majority of the sub-block being within the second partition.

There may be various reasons for video encoder 200 and video decoder 300 to store the motion vector information. As one example, video encoder 200 and video decoder 300 may construct a candidate list for merge mode or advanced motion vector prediction (AMVP) mode for a subsequent block based on the stored respective bi-prediction motion vectors.

In addition to storing the motion vector information for sub-blocks, video encoder 200 and video decoder 300 may encode or decode the current block. For example, video encoder 200 may determine a residual block based on a difference between the current block and the final prediction block and signaling information indicative of the residual block. Video decoder 300 may receive information indicative of a residual block for a difference between the final prediction block and the current block and reconstruct the current block based on the final prediction block and the residual block.

The following describes example techniques that may be used separately or in combination.

Example 1. A method of coding video data, the method comprising determining one or more angles, from a set of angles, to be used for partitioning a current block using geometric partition mode (GEO), wherein the set of angles from which the one or more angles are determined are the same as a set of angles available for triangle partition mode (TPM), partitioning the current block based on the determined one or more angles, and coding the current block based on the partitioning of the current block.

Example 2. A method of coding video data, the method comprising determining one or more weights, from a set of weights, to be used for blending a current block using geometric partition mode (GEO), wherein the set of weights from which the one or more weights are determined are the same as a set of weights available for triangle partition mode (TPM), blending the current block based on the determined one or more weights, and coding the current block based on the blending of the current block.

Example 3. A method of coding video data, the method comprising determining a motion field storage for using geometric partition mode (GEO), wherein the motion field storage is the same as a motion field storage available for triangle partition mode (TPM) and coding the current block based on the determined motion field storage.

Example 4. A method comprising any combination of examples 1-3.

Example 5. The method of any one or combination of examples 1-3, wherein coding comprises decoding.

Example 6. The method of any one or combination of examples 1-3, wherein coding comprises encoding.

Example 7. A device for coding video data, the device comprising memory configured to store video data and processing circuitry, coupled to the memory, configured to perform any one or combination of examples 1-3.

Example 8. The device of example 7, further comprising a display configured to display decoded video data.

Example 9. The device of any of examples 7 and 8, wherein the device comprises one or more of a camera, a computer, a mobile device, a broadcast receiver device, or a set-top box.

Example 10. The device of any of examples 7-9, wherein the device comprises a video decoder.

Example 11. The device of any of examples 7-9, wherein the device comprises a video encoder.

Example 12. A computer-readable storage medium having stored thereon instructions that, when executed, cause one or more processors to perform the method of any one or combination of examples 1-3.

Example 13. A device for coding video data, the device comprising means for performing the method of any one or combination of examples 1-3.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    determining a first partition for a current block of the video data coded in geometric partition mode and a second partition for the current block of the video data;
    determining a first prediction block of the video data based on a first motion vector for the first partition and a second prediction block of the video data based on a second motion vector for the second partition;
    blending the first prediction block and the second prediction block based on weights indicative of an amount to scale samples in the first prediction block and an amount to scale samples in the second prediction block to generate a final prediction block for the current block;
    dividing the current block into a plurality of sub-blocks;
    determining a set of sub-blocks that each include at least one sample that corresponds to a respective prediction sample in the final prediction block that was generated based on equal weighting of a respective sample in the first prediction block and a respective sample in the second prediction block, wherein a first sub-block in the set of sub-blocks includes:
        a first sample that corresponds to a first prediction sample in the final prediction block that was generated based on equal weighting of a first sample in the first prediction block and a first sample in the second prediction block, and
        a second sample that corresponds to a second prediction sample in the final prediction block that was generated based on no weighting of any sample in the first prediction block or no weighting of any sample in the second prediction block; and
    storing respective bi-prediction motion vectors for each sub-block in the determined set of sub-blocks including the first sub-block in the set of sub-blocks.

2. The method of claim 1, wherein the set of sub-blocks comprises a first set of sub-blocks, the method further comprising:
    determining a second set of sub-blocks that do not include any samples that correspond to prediction samples in the final prediction block that were generated based on equal weighting of samples in the first prediction block and samples in the second prediction block;
    determining, for each sub-block in the second set of sub-blocks, whether a majority of a sub-block in the second set of sub-blocks is within the first partition or the second partition; and
    storing, for each sub-block in the second set of sub-blocks, the first motion vector based on the majority of the sub-block in the second set of sub-blocks being within the first partition or the second motion vector based on the majority of the sub-block in the second set of sub-blocks being within the second partition.

3. The method of claim 1, wherein storing respective bi-prediction motion vectors for each sub-block comprises:
    determining whether the first motion vector and the second motion vector are from different reference picture lists; and
    one of:
        storing both the first motion vector and the second motion vector for each sub-block of the set of sub-blocks based on the first motion vector and the second motion vector being from different reference picture lists, or
        selecting one of the first motion vector or the second motion vector based on the first motion vector and the second motion vector being from the same reference picture list, and
        storing the selected one of the first motion vector or the second motion vector for each sub-block of the set of sub-blocks.

4. The method of claim 1, wherein each sub-block is of size 4×4.

5. The method of claim 1, further comprising:
storing a table of weights for a slope of a partition line that partitions the current block into the first partition and the second partition,
wherein determining the set of sub-blocks comprises determining the set of sub-blocks based on the stored table and an offset into the table.

6. The method of claim 1, further comprising:
constructing a candidate list for merge mode or advanced motion vector prediction (AMVP) mode for a subsequent block based on the stored respective bi-prediction motion vectors.

7. The method of claim 1, further comprising:
receiving information indicative of a residual block for a difference between the final prediction block and the current block; and
reconstructing the current block based on the final prediction block and the residual block.

8. The method of claim 1, further comprising:
determining a residual block based on a difference between the current block and the final prediction block; and
signaling information indicative of the residual block.

9. A device for processing video data, the device comprising:
memory configured to store the video data; and
processing circuitry coupled to the memory and configured to:
determine a first partition for a current block of the video data coded in geometric partition mode and a second partition for the current block of the video data;
determine a first prediction block from the stored video data based on a first motion vector for the first partition and a second prediction block from the stored video data based on a second motion vector for the second partition;
blend the first prediction block and the second prediction block based on weights indicative of an amount to scale samples in the first prediction block and an amount to scale samples in the second prediction block to generate a final prediction block for the current block;
divide the current block into a plurality of sub-blocks;
determine a set of sub-blocks that each include at least one sample that corresponds to a respective prediction sample in the final prediction block that was generated based on equal weighting of a respective sample in the first prediction block and a respective sample in the second prediction block, wherein a first sub-block in the set of sub-blocks includes:
a first sample that corresponds to a first prediction sample in the final prediction block that was generated based on equal weighting of a first sample in the first prediction block and a first sample in the second prediction block, and
a second sample that corresponds to a second prediction sample in the final prediction block that was generated based on no weighting of any sample in the first prediction block or no weighting of any sample in the second prediction block; and
store respective bi-prediction motion vectors for each sub-block in the determined set of sub-blocks including the first sub-block in the set of sub-blocks.

10. The device of claim 9, wherein the set of sub-blocks comprises a first set of sub-blocks, the processing circuitry is configured to:
determine a second set of sub-blocks that do not include any samples that correspond to prediction samples in the final prediction block that were generated based on equal weighting of samples in the first prediction block and samples in the second prediction block;
determine, for each sub-block in the second set of sub-blocks, whether a majority of a sub-block in the second set of sub-blocks is within the first partition or the second partition; and
store, for each sub-block in the second set of sub-blocks, the first motion vector based on the majority of the sub-block in the second set of sub-blocks being within the first partition or the second motion vector based on the majority of the sub-block in the second set of sub-blocks being within the second partition.

11. The device of claim 9, wherein to store respective bi-prediction motion vectors for each sub-block, the processing circuitry is configured to:
determine whether the first motion vector and the second motion vector are from different reference picture lists; and
one of:
store both the first motion vector and the second motion vector for each sub-block of the set of sub-blocks based on the first motion vector and the second motion vector being from different reference picture lists, or
select one of the first motion vector or the second motion vector based on the first motion vector and the second motion vector being from the same reference picture list, and
store the selected one of the first motion vector or the second motion vector for each sub-block of the set of sub-blocks.

12. The device of claim 9, wherein each sub-block is of size 4×4.

13. The device of claim 9, wherein the processing circuitry is configured to:
store a table of weights for a slope of a partition line that partitions the current block into the first partition and the second partition,
wherein to determine the set of sub-blocks, the processing circuitry is configured to determine the set of sub-blocks based on the stored table and an offset into the table.

14. The device of claim 9, wherein the processing circuitry is configured to:
construct a candidate list for merge mode or advanced motion vector prediction (AMVP) mode for a subsequent block based on the stored respective bi-prediction motion vectors.

15. The device of claim 9, wherein the processing circuitry is configured to:
receive information indicative of a residual block for a difference between the final prediction block and the current block; and
reconstruct the current block based on the final prediction block and the residual block.

16. The device of claim 9, wherein the processing circuitry is configured to:
determine a residual block based on a difference between the current block and the final prediction block; and
signal information indicative of the residual block.

17. The device of claim 9, wherein the device comprises one or more of a camera, a computer, a mobile device, a broadcast receiver device, or a set-top box.

18. A computer-readable storage medium storing instructions thereon that when executed cause one or more processors of a device for processing video data to:
  determine a first partition for a current block of the video data coded in geometric partition mode and a second partition for the current block of the video data;
  determine a first prediction block of the video data based on a first motion vector for the first partition and a second prediction block of the video data based on a second motion vector for the second partition;
  blend the first prediction block and the second prediction block based on weights indicative of an amount to scale samples in the first prediction block and an amount to scale samples in the second prediction block to generate a final prediction block for the current block;
  divide the current block into a plurality of sub-blocks;
  determine a set of sub-blocks that each include at least one sample that corresponds to a respective prediction sample in the final prediction block that was generated based on equal weighting of a respective sample in the first prediction block and a respective sample in the second prediction block, wherein a first sub-block in the set of sub-blocks includes:
    a first sample that corresponds to a first prediction sample in the final prediction block that was generated based on equal weighting of a first sample in the first prediction block and a first sample in the second prediction block, and
    a second sample that corresponds to a second prediction sample in the final prediction block that was generated based on no weighting of any sample in the first prediction block or no weighting of any sample in the second prediction block; and
  store respective bi-prediction motion vectors for each sub-block in the determined set of sub-blocks including the first sub-block in the set of sub-blocks.

19. The computer-readable storage medium of claim 18, wherein the set of sub-blocks comprises a first set of sub-blocks, the instructions further comprising instructions that cause the one or more processors to:
  determine a second set of sub-blocks that do not include any samples that correspond to prediction samples in the final prediction block that were generated based on equal weighting of samples in the first prediction block and samples in the second prediction block;
  determine, for each sub-block in the second set of sub-blocks, whether a majority of a sub-block in the second set of sub-blocks is within the first partition or the second partition; and
  store, for each sub-block in the second set of sub-blocks, the first motion vector based on the majority of the sub-block in the second set of sub-blocks being within the first partition or the second motion vector based on the majority of the sub-block in the second set of sub-blocks being within the second partition.

20. The computer-readable storage medium of claim 18, wherein the instructions that cause the one or more processors to store respective bi-prediction motion vectors for each sub-block comprise instructions that cause the one or more processors to:
  determine whether the first motion vector and the second motion vector are from different reference picture lists; and
  one of:
    store both the first motion vector and the second motion vector for each sub-block of the set of sub-blocks based on the first motion vector and the second motion vector being from different reference picture lists, or
    select one of the first motion vector or the second motion vector based on the first motion vector and the second motion vector being from the same reference picture list, and
    store the selected one of the first motion vector or the second motion vector for each sub-block of the set of sub-blocks.

21. The computer-readable storage medium of claim 18, wherein each sub-block is of size 4×4.

22. The computer-readable storage medium of claim 18, further comprising instructions that cause the one or more processors to:
  store a table of weights for a slope of a partition line that partitions the current block into the first partition and the second partition,
  wherein the instructions that cause the one or more processors to determine the set of sub-blocks comprise instructions that cause the one or more processors to determine the set of sub-blocks based on the stored table and an offset into the table.

23. A device for processing video data, the device comprising:
  means for determining a first partition for a current block of the video data coded in geometric partition mode and a second partition for the current block of the video data;
  means for determining a first prediction block of the video data based on a first motion vector for the first partition and a second prediction block of the video data based on a second motion vector for the second partition;
  means for blending the first prediction block and the second prediction block based on weights indicative of an amount to scale samples in the first prediction block and an amount to scale samples in the second prediction block to generate a final prediction block for the current block;
  means for dividing the current block into a plurality of sub-blocks;
  means for determining a set of sub-blocks that each include at least one sample that corresponds to a respective prediction sample in the final prediction block that was generated based on equal weighting of a respective sample in the first prediction block and a respective sample in the second prediction block, wherein a first sub-block in the set of sub-blocks includes:
    a first sample that corresponds to a first prediction sample in the final prediction block that was generated based on equal weighting of a first sample in the first prediction block and a first sample in the second prediction block, and
    a second sample that corresponds to a second prediction sample in the final prediction block that was generated based on no weighting of any sample in the first prediction block or no weighting of any sample in the second prediction block; and
  means for storing respective bi-prediction motion vectors for each sub-block in the determined set of sub-blocks including the first sub-block in the set of sub-blocks.

24. The device of claim 23, wherein the set of sub-blocks comprises a first set of sub-blocks, the device further comprising:

means for determining a second set of sub-blocks that do not include any samples that correspond to prediction samples in the final prediction block that were generated based on equal weighting of samples in the first prediction block and samples in the second prediction block;

means for determining, for each sub-block in the second set of sub-blocks, whether a majority of a sub-block in the second set of sub-blocks is within the first partition or the second partition; and means for storing, for each sub-block in the second set of sub-blocks, the first motion vector based on the majority of the sub-block in the second set of sub-block being within the first partition or the second motion vector based on the majority of the sub-block in the second set of sub-blocks being within the second partition.

25. The device of claim 23, wherein the means for storing respective bi-prediction motion vectors for each sub-block comprises:

means for determining whether the first motion vector and the second motion vector are from different reference picture lists; and means for storing both the first motion vector and the second motion vector for each sub-block of the set of sub-blocks based on the first motion vector and the second motion vector being from different reference picture lists, or means for selecting one of the first motion vector or the second motion vector based on the first motion vector and the second motion vector being from the same reference picture list, and storing the selected one of the first motion vector or the second motion vector for each sub-block of the set of sub-blocks.

26. The device of claim 23, wherein each sub-block is of size 4×4.

27. The device of claim 23, further comprising:

means for storing a table of weights for a slope of a partition line that partitions the current block into the first partition and the second partition, wherein the means for determining the set of sub-blocks comprises means for determining the set of sub-blocks based on the stored table and an offset into the table.

* * * * *